United States Patent [19]

Narusawa et al.

[11] Patent Number: 4,707,805
[45] Date of Patent: Nov. 17, 1987

[54] DATA PROCESSING CIRCUIT FOR DIGITAL AUDIO SYSTEM

[75] Inventors: Sadayuki Narusawa; Norio Tomisawa, both of Hamamatsu, Japan

[73] Assignee: Nippon Gakki Seizo Kabushiki Kaisha, Shizuoka, Japan

[21] Appl. No.: 657,487

[22] Filed: Oct. 3, 1984

[30] Foreign Application Priority Data

Oct. 5, 1983 [JP] Japan ................ 58-186104
Nov. 26, 1983 [JP] Japan ................ 58-222998
Nov. 26, 1983 [JP] Japan ................ 58-222999

[51] Int. Cl.$^4$ .............. G06F 13/00; G06F 3/00; G11B 7/00
[52] U.S. Cl. .................... 364/900; 369/60; 371/2; 360/32
[58] Field of Search ... 364/200 MS File, 900 MS File; 369/60; 371/2; 360/32, 39, 49

[56] References Cited

U.S. PATENT DOCUMENTS

| | | | |
|---|---|---|---|
| 3,299,261 | 1/1967 | Steigerwalt, Jr. ........... | 364/900 |
| 3,938,096 | 2/1976 | Brown et al. ............. | 364/200 |
| 4,128,875 | 12/1978 | Thurber et al. ........... | 364/200 |
| 4,333,143 | 6/1982 | Calder .................. | 364/200 |
| 4,434,502 | 2/1984 | Arakawa et al. .......... | 364/900 |
| 4,447,873 | 5/1984 | Price et al. ............. | 364/200 |
| 4,532,629 | 7/1985 | Furuya et al. ........... | 371/44 |

FOREIGN PATENT DOCUMENTS 0052520 5/1982 European Pat. Off. .

Primary Examiner—Archie E. Williams, Jr.
Assistant Examiner—William G. Niessen
Attorney, Agent, or Firm—Spensley Horn Jubas & Lubitz

[57] ABSTRACT

There is provided a data processing circuit for processing symbol data read from a disc of a digital audio system such as a DAD player. Each of the symbol data read from the disc is first stored into a buffer register and then transferred therefrom to a symbol memory in accordance with internal pulse signals, and the number of the pulse signals generated during a period required to process one frame of symbol data is greater than that of symbol data contained in one frame of symbol data. An address data for addressing a desired area of the symbol memory is formed by adding a reference address data generated by counting the internal frame synchronization signals to a relative address data generated by adding together a specific pair of addressing data read out from an address memory, the address memory storing a plurality of groups of addressing data to be used in accordance with each mode of operation of this circuit. When the symbol data is written into the symbol memory, the reference address data is modified by adding an output of an up/down-counter to compensate for jitters of the symbol data, the up/down-counter counting frame synchronization signals discriminated from the data read from the disc in one of upward and downward directions and counting the internal frame synchronization signals in the other of upward and downward directions.

9 Claims, 21 Drawing Figures

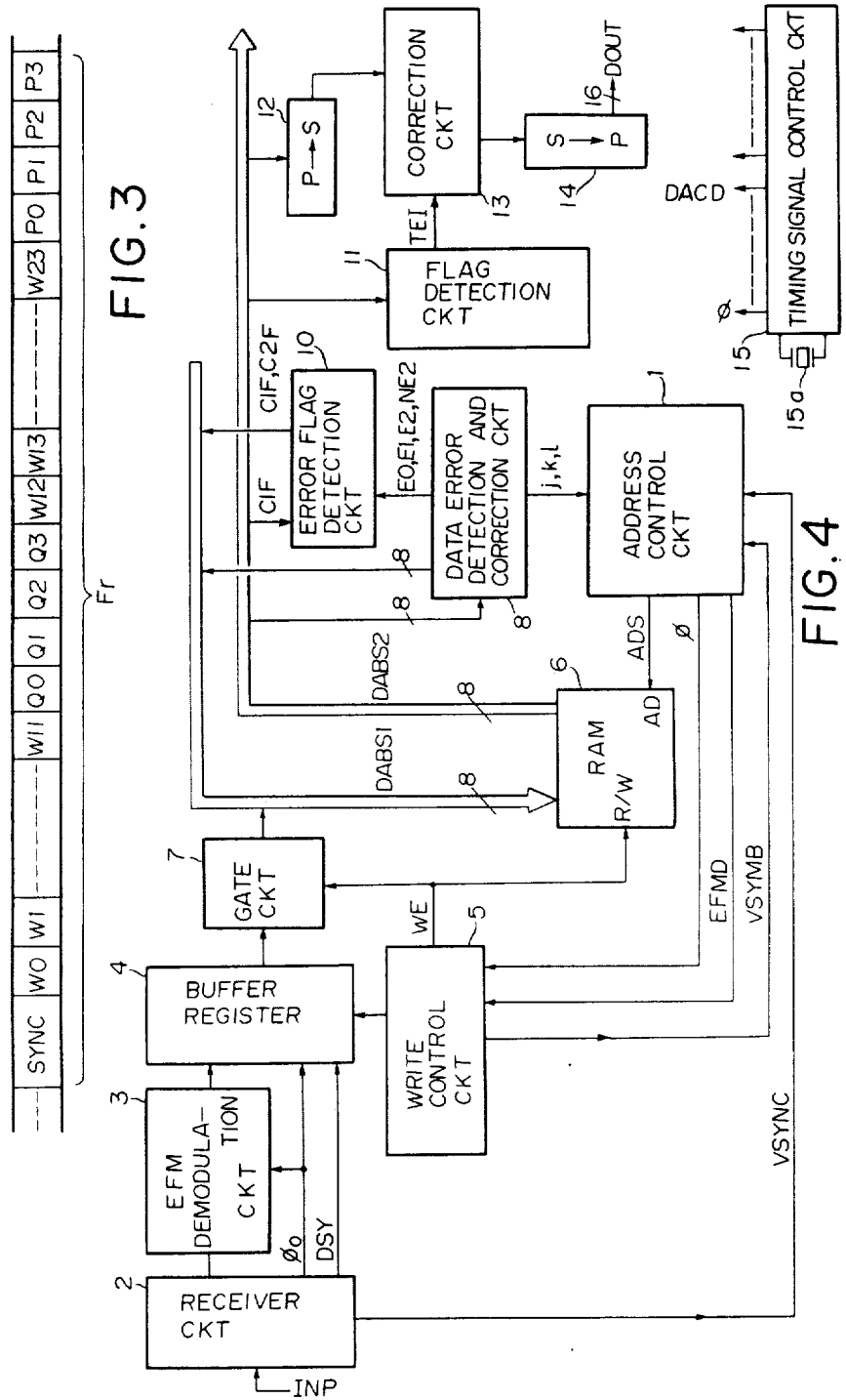

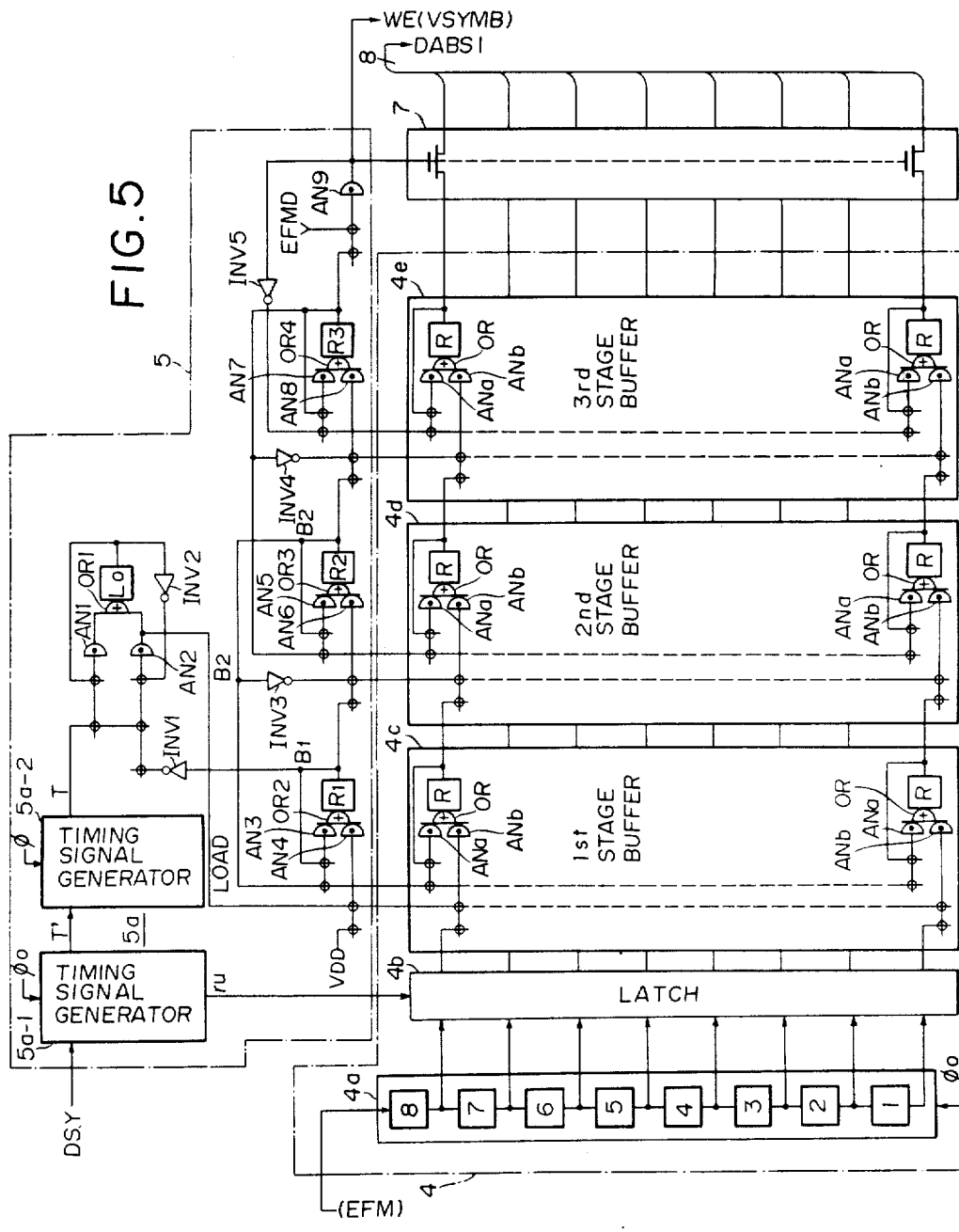

| DO | |
|---|---|
| 0 | 0 |
| 1 | 0 |
| 2 | 1 |
| 3 | 6 |
| 4 | 7 |
| 5 | 1 |
| 6 | 16 |
| 7 | 17 |
| 8 | 22 |
| 9 | 23 |
| 10 | 2 |
| 11 | 2 |
| 12 | 3 |
| 13 | 8 |
| 14 | 9 |
| 15 | 3 |
| 16 | 18 |
| 17 | 19 |
| 18 | 24 |
| 19 | 25 |
| 20 | 4 |
| 27 | 4 |
| 22 | 5 |
| 23 | 10 |
| 24 | 11 |
| 25 | 5 |
| 26 | 20 |
| 27 | 21 |
| 28 | 26 |
| 29 | 27 |
| 30 | |
| 31 | |

FIG.13

| D I | EFMD·AD | RC1F·AD | WC2F·AD | DACD·AD | RC2F·AD |
|---|---|---|---|---|---|
| 0 | 135 | 108 | 109 | 109 | 110 |
| 1 | 254 | 104 | 111 | 106 | 114 |
| 2 | 370 | 100 | 115 | 101 | 116 |
| 3 | 481 | 96 | 117 | 98 | 120 |
| 4 | 589 | 92 | 121 | 93 | 122 |
| 5 | 692 | 88 | 123 | 90 | 126 |
| 6 | 792 | 84 | | 85 | |
| 7 | 887 | 80 | | 82 | |
| 8 | 979 | 76 | | 77 | |
| 9 | 1066 | 72 | | 74 | |
| 10 | 1150 | 68 | | 69 | |
| 11 | 1229 | 64 | | 66 | |
| 12 | 1305 | 60 | | — | |
| 13 | 1370 | 56 | | — | |
| 14 | 1442 | 52 | | — | |
| 15 | 1504 | 48 | | — | |
| 16 | 1563 | 44 | | 47 | |
| 17 | 1620 | 40 | | 44 | |
| 18 | 1674 | 36 | | 39 | |
| 19 | 1723 | 32 | | 36 | |
| 20 | 1769 | 28 | | 31 | |
| 21 | 1810 | 24 | | 28 | |
| 22 | 1848 | 20 | | 23 | |
| 23 | 1881 | 16 | | 20 | |
| 24 | 1911 | 12 | | 15 | |
| 25 | 1936 | 8 | | 12 | |
| 26 | 1958 | 4 | | 7 | |
| 27 | 1975 | 0 | | 4 | |
| 28 | 1989 | | | | |
| 29 | 1999 | | | | |
| 30 | 2010 | | | | |
| 31 | 2020 | | | | |

DATA PROCESSING CIRCUIT FOR DIGITAL AUDIO SYSTEM

BACKGROUND OF THE INVENTION

1. Field of the Invention

This invention relates to a data processing circuit for use in a digital audio system such as a digital audio disc (DAD) player.

2. Prior Art

For correcting data errors in a digital audio disc, there has recently been used a CIRC (Cross Interleave Reed Solomon Code) method. With this method, musical signal data read from the disc in a digital audio disc player are once stored in an associated memory, and then the data are read from this memory, checked, corrected if the data contain any error, and fed to DAC (digital- to-analog converter) through associated circuits. This invention relates to a data processing circuit for performing the above-described data processing of the musical signal data with simplified hardware.

A digital audio disc player in which the data error is detected with the CIRC method will now be described. This data error detection method is already known in the art and is described in Japanese Patent Application Laid-Open (Kokai) No. 57-4629.

FIGS. 1 and 2 diagrammatically show a write circuit for writing data into the disc and a data processing circuit for processing the data read from the disc, respectively. In FIG. 1, reference characters L6n, R6n ----- R6n+5 each designates musical signal data composed of 16 bits, and each musical signal data is composed of two symbols each having 8 bits. For example, the musical signal data L6n is composed of two symbols W12n,A and W12n,B. The total of 24 musical signal symbols W12n,A to W12n+11,B of the musical signal data L6n to R6n+5 are selectively delayed by two units of delay time at delay portion Dly1 and then the order of them are changed at cross portion Cr1. Then parity symbols Q12n to Q12n+3 for error detection based on a Reed Solomon Code method are added to the musical signal symbols at parity circuit Pa1 so that the total of the symbols is 28, each parity symbol having 8 bits. The 28 symbols are again delayed at delay portion Dly2 (Interleave). In this delay portion Dly2, "D" designates 4 units of delay time (FIG. 1). Then, 4 error correction parity symbols P12n to P12n+3 based on the Reed Solomon Code method are added to the symbols at parity circuit Pa2 so that the total of the symbols is 32, each parity symbol having 8 bits. The 32 symbols are selectively delayed by one unit of delay time at delay portion Dly3. Then, complementary data of the parity symbols P and Q are outputted from inverters shown in the figure. Thus, data DWD to be recorded on the disc are formed. The data DWD are sequentially modulated in an EFM (Eight to Fourteen Modulation) manner from the top symbol (FIG. 1) and are written into the disc.

FIG. 3 schematically shows a format of the data as recorded on the disc, the data comprising a number of frames Fr each of which includes a synchronization pattern SYNC added to the data to be recorded on the disc, symbols W0 to W23 corresponding to the musical data, and error correction parity symbols Q0 to Q3 and P0 to P3. The frame Fr is a data unit for data error correction. When a symbol is be delayed by one unit of delay time, the symbol is written into a frame Fr next to the frame Fr into which the symbol would otherwise be written if it were not delayed.

Next, for reproducing the data, the data read from the disc are demodulated by an EFM demodulation circuit and changed into the data DWD, i.e., the data as they were before being written into the disc. Each symbol of the data DWD is first selectively delayed by one unit of delay time by delay portion Dly4 (FIG. 2), so that the delay of symbol effected by delay portion Dly3 (FIG. 1) is corrected. Then, the error correction parity symbols P and Q are fed to C1 decode circuit C1dec via inverters while the other symbols are fed directly to C1 decode circuit C1dec. C1 decode circuit C1dec calculates syndromes in accordance with each symbol, and detects incorrect symbols with the Reed Solomon Code method, using the syndromes so calculated (error detection based on parity symbols P), and corrects the data errors. Each symbol outputted from C1 decode circuit C1dec is delayed by delay portion Dly5, so that the delay of the symbols effected by delay portion Dly2 (FIG. 1) is corrected, and fed to C2 decode circuit C2dec. C2 decode circuit C2dec detects and corrects the errors (error detection based on parity symbols Q) in the symbols in the same manner as C1 decode circuit C1dec does. The order of the symbols outputted from the C2 decode circuit C2dec is changed by cross portion Cr 2, so that the order of the symbols changed by cross portion Cr 1 is restored. Then, the symbols are selectively delayed by delay portion Dly6 by a time period corresponding to two symbols, so that the delay of the symbols effected by the delay portion Dly1 (FIG. 1) is corrected to obtain the original musical signal data L6n to R6n+5 again. These musical signal data are sequentially fed to DAC in which they are converted into analog signals, and then these signals are applied to a loudspeaker to produce musical sounds.

The data processing including data error correction with the CIRC method in the digital audio system is performed as described above. A memory for storing the symbols (symbol memory) is not shown in FIGS. 1 and 2. Actually, however, the symbols read out from the disc are once stored in the memory and then these symbols are read from this memory and subjected to the processing in FIG. 2, including the delay processing. Thus, it is necessary for a data processing circuit of a digital audio system to control the writing into memory of the musical data read from the disc and the addressing of the memory in a complicated manner.

SUMMARY OF THE INVENTION

It is an object of this invention to provide a data processing circuit for a digital audio system in which addressing of a memory for storing symbol data read from a disc and for correcting data error thereof using the CIRC method can be achieved with a simplified hardware.

It is another object of this invention to provide a data processing circuit for a digital audio system in which an accurate operation is retained even if there has been developed jitter of signals read from a disc due to variation of disc revolution rate.

It is a further object of this invention to provide a data processing circuit for such a digital audio system in which symbol data read from a disc can be written into the memory with a minimum of hardware.

According to one aspect of the present invention, there is provided a data processing circuit for a digital audio system in which symbol data read from a recording means are once stored in a symbol memory so that data errors included in the stored symbol data are detected and corrected, the symbol data contained in the symbol memory after the detection and correction being read from the symbol memory for conversion into analog signals, which circuit comprises a reference address data generating circuit for generating a reference address data indicative of a reference address of the symbol memory; a relative address data generating circuit for generating a relative address data indicative of a relative address of the symbol memory; and an adder for adding the relative address data to the reference address data to form an absolute address data indicative of an absolute address of the symbol memory, the absolute address data being supplied to the symbol memory to address the absolute address of the symbol memory so that a symbol data in the absolute address is processed. The data processing circuit may further comprise an internal clock pulse generating circuit for generating an internal clock pulse; an internal frame synchronization signal generating circuit responsive to the internal clock pulses for generating an internal frame synchronization signal representative of the transition from one data processing period of a frame of the stored symbol data to another data processing period following the one data processing period; and an EFM synchronization signal generating circuit for discriminating a frame synchronization pattern from the symbol data read from the recording means to output an EFM frame synchronization signal; the reference address data generating circuit comprising (a) a first counter for counting the internal frame synchronization signals, (b) a second counter for counting the internal frame synchronization signals in one of upward and downward directions and for counting the EFM frame synchronization signals in the other of upward and downward directions, and (c) a second adder for adding both outputs of the first and second counters together when the symbol data read from the recording means are being stored in the symbol memory, the second adder outputting the output of the first counter when the symbol data read from the recording means are not being stored in the symbol memory, an output of the second adder being supplied to the first adder as the reference address data.

According to another aspect of the present invention, there is provided a data processing circuit for a digital audio system in which symbol data read from a recording means are stored in a symbol memory in a first mode of operation the data processing circuit so that data errors included in the stored symbol data are detected and corrected in a second mode of operation of the circuit, the symbol data contained in the symbol memory after the detection and correction being read from the symbol memory in a third mode of operation of the circuit for conversion into an analog signal, the data processing circuit comprising a reference address data generating circuit for generating a reference address data indicative of a reference address of the symbol memory; an address memory having a plurality of storage areas for storing addressing data to be used in combination with the reference address data; first to third counters operable in the first to third modes of operation, respectively; a first selector for selectively supplying one of outputs of the first to third counters to the address memory to simultaneously address one of addresses of each of the storage areas; a second selector for selectively outputting a specific pair of addressing data read from the address memory; a first adder for adding the specific pair of addressing data together to form a relative address data indicative of a relative address of the symbol memory; and a second adder for adding the relative address data to the reference address data to form an absolute address data indicative of an absolute address of the symbol memory, the absolute address data being supplied to the symbol memory to address the absolute address of the symbol memory so that a symbol data in the absolute address is processed. The reference address data generating circuit may comprise an internal clock pulse generating circuit for generating an internal clock pulse; a first signal generating circuit responsive to the internal clock pulses for generating an internal frame synchronization signal representative of the transition from one data processing period of a frame of the stored symbol data to another data processing period following the one data processing period; and a second signal generating circuit for discriminating a frame synchronization pattern from the symbol data read from the recording means to output an EFM frame synchronization signal; the reference address data generating circuit comprising (a) a fourth counter for counting the internal frame synchronization signals, (b) a fifth counter for counting the internal frame synchronization signals in one of upward and downward directions and for counting the EFM synchronization signals in the other of upward and downward directions, and (c) a third adder for adding both outputs of the fourth and fifth counters together when the symbol data read from the recording means are being stored in the symbol memory, the third adder outputting the output of the fourth counter when the symbol data read from the recording means are not being stored in the symbol memory, an output of the third adder being supplied to the second adder as the reference address data.

According to a further aspect of the present invention there is provided a data processing circuit for such a digital audio system which comprises a buffer register for temporarily storing each of the symbol data read from the recording means; a signal generating circuit for outputting a first signal when each of the symbol data read from the recording means is stored in the buffer register; a timing pulse generating circuit for generating a specific number of timing pulses during each period required for processing one frame of the symbol data, the specific number being greater than the number of symbol data in one frame of the symbol data; and a write control circuit for writing the symbol data stored in the buffer register into the symbol memory when both of the first signal and the timing pulse are outputted. In this case, the buffer register may comprise a plurality of registers serially connected to one another to form stages, each of the symbol data read from the recording means being stored into the first stage register of the registers, a symbol data stored in one of stages of the registers being transferred to the stage next to the one of the stages when the next stage is empty, the signal generating circuit generating the first signal when one of the symbol data is stored in the last stage of the registers, the write control circuit writing the symbol data stored in the last stage of the registers into the symbol memory when both of the first signal and the timing pulse are outputted.

BRIEF DESCRIPTION OF THE DRAWINGS

FIG. 3 is an illustration showing a format of the data recorded on the disc;

FIG. 4 is a block diagram of a main portion of a digital audio disc player;

FIG. 5 is a block diagram of the buffer register 4 and the write control circuit 5;

FIG. 12a is an output data table for the selector (37) of the address control circuit of FIG. 12;

FIGS. 13 and 14 are illustrations of the ROMs 34 and 36 of the address control circuit 1 of FIG. 12;

FIG. 18 is an illustration of the areas of RAM 6 for storing C2 flags;

DESCRIPTION OF THE PREFERRED EMBODIMENT OF THE INVENTION

Figure 1:
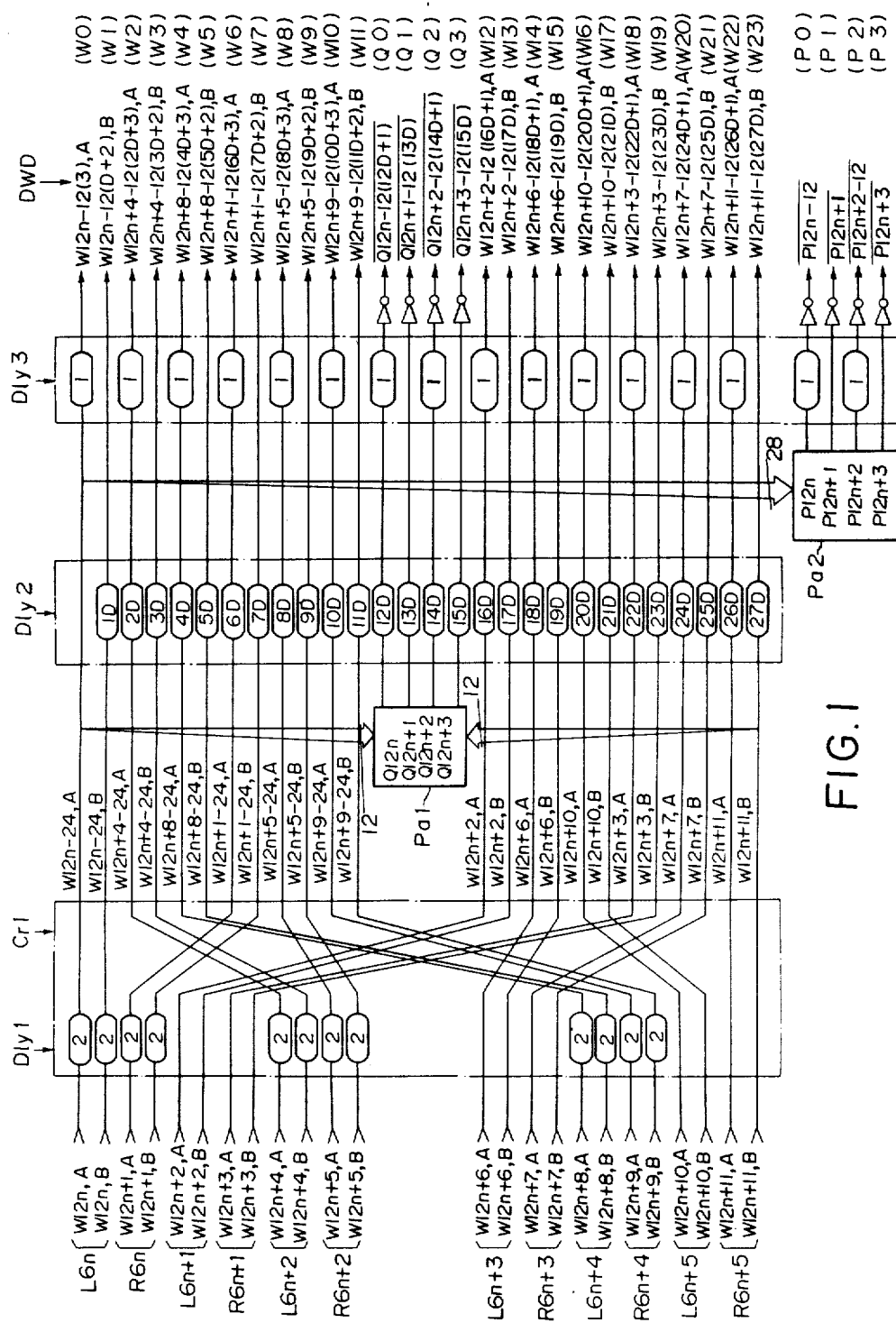
FIG. 1 and 2 are diagrammatical illustrations of a write circuit for writing data into a disc and of a data processing circuit for processing data read from the disc, respectively.

FIG. 4 is a block diagram of a main portion of a digital audio disc player incorporating an address control circuit 1 provided in accordance with the present invention. The digital audio disc player reproduces symbols W0 to W23, written into the disc in accordance with the format shown in FIG. 3, as musical signals, and performs the processing shown in FIG. 2.

In FIG. 4, a signal INP read out from the disc through an associated optical system, is applied to a receiver circuit 2, the signal INP being modulated in an EFM fashion. The receiver circuit 2 produces EFM frame synchronization signal VFSYNC in accordance with a synchronization pattern SYNC contained in the signal INP, and feeds it to the address control circuit 1. Also, the receiver circuit 2 outputs a signal, representative of data bits of the INP signal other than those constituting the synchronization pattern SYNC, to EFM demodulation circuit 3. Further, the receiver circuit 2 reproduces EFM clock pulses $\phi$o from the signal INP and feeds the clock pulses to EFM demodulation circuit 3 and buffer register 4. Also, the receiver circuit 2 outputs symbol synchronization signal DSY to buffer register 4 when the foremost bit of each of symbols W0 to W23, Q0 to Q3 and P0 to P3, i.e., W0, Q0 and P0 is outputted from the receiver circuit 2. Actually, clock pulses $\phi$oa and $\phi$ob, which are 180° out of phase with each other, are produced as EFM clock pulses $\phi$o, but here for simplicity they are shown as EFM clock pulses $\phi$o. The EFM demodulation circuit 3 converts an EFM modulated symbol (channel bits composed of 14 bits) into its original 8-bit symbol. The thus demodulated symbols are serially outputted sequentially to buffer register 4. Buffer register 4 serves to temporarily store the symbols fed from EFM demodulation circuit 3, and comprises a serial-to-parallel converter circuit for converting the serial data, fed from EFM demodulation circuit 3, into parallel data, and a plurality of registers. The output of buffer register 4 is fed to gate circuit 7. A write control circuit 5 serves to control the writing and reading operation of buffer register 4. The write control circuit 5 is responsive to control signal EFMD from address control circuit 1 to output control signal WE to both read/write terminal R/W of RAM (random access memory) 6 and a control terminal of the gate circuit 7, so that the data writing of RAM 6 is enabled and that the gate circuit 7 is opened. Therefore, the data are fed from the buffer register 4 through the gate circuit 7 and a data bus DABS1 and are written respectively into addresses of RAM 6 designated by the address control circuit 1. When the data are outputted from the buffer register 4 to the RAM 6, the write control circuit 5 feeds a control signal VSYMB to the address control circuit 1.

The RAM 6 is 2K-byte memory and stores the symbols W0 to W23, Q0 to Q3 and P0 to P3 and flags mentioned later. As described above, the digital audio player shown in FIG. 4 effects the processing shown in FIG. 2, and the delay processings effected by delay portions Dly4, Dly5 and Dly6 are performed using the RAM 6. More specifically, the symbols corresponding in number to the units of delay time of the symbols W0 to W23, Q0 to Q3 and P0 to P3 are stored in the RAM 6. For example, symbol W0 requires delay of 27D (108 delay units), and therefore with respect to symbol W0, at least 109 (108+1) symbols (actually, 119 symbols) are stored in the RAM 6 from. And, at the time of C2 decode, symbol W0 stored in the RAM 6 108 frames before is used. The same is true of the other symbols.

The address control circuit 1 produces address data ADS for writing symbols W0 to W23, Q0 to Q3 and P0 to P3 into the RAM 6, for reading the symbols from RAM 6 for the C1 and C2 decodings, and for reading from the RAM 6 symbols W0 to W23 (these symbols have been processed by delay portions Dly4 to Dly6 and cross portion Cr 2) to output them to the DAC (not shown), the address data ADS being fed to the address terminal AD of the RAM 6.

A data error detection and correction circuit 8 performs the C1 decoding and C2 decoding. More specifically, at the time of C1 decoding, the circuit 8 receives symbols W0 to W23, Q0 to Q3 and P0 to P3 (these symbols have been processed by delay portion Dly4) read sequentially from the RAM 6 under the control of the address control circuit 1, and calculates syndromes based on these symbols to determine whether there is any data error and whether there is one, two or at least three data errors. Then, when it is detected that there is no data error, the data error detection and correction circuit 8 outputs "1" signal as flag E0 to error flag detection circuit 10. Also, when a single data error is detected, the circuit 8 outputs "1" signal as flag E1 to the error flag detection circuit 10, and when double error is detected, the circuit 8 outputs "1" signal as flag E2. Further, when not less than three errors are detected, the circuit 8 outputs "1" signal as flag NE2 to the error flag detection circuit 10. If a single error is detected, for example, if there is an error only in symbol Wj, the data error detection and correction circuit 8 outputs data j, representative of the position of the data Wj, to the address control circuit 1. If double error, for example, an error in each of symbols Wk and Wl, is detected, the data error detection and correction circuit 8 outputs data k and l, representative of the positions of the symbols Wk and Wl, to the address control circuit 1. In this case, the address control circuit 1 produces address data in accordance with each of the data j, k and l and feeds them to the RAM 6, the address data indicating the locations of the RAM storing the incorrect symbols Wj, Wk and Wl. As a result, the symbols Wj, Wk and Wl are read from the RAM 6. The data error detection and correction circuit 8 inputs thereinto symbols Wj, Wk and Wl, and corrects them, and outputs the correct symbols Wj, Wk and Wl to the data bus DABS1. At this time, the address control circuit 1 again produces address data for the symbols Wj, Wk and Wl and outputs them to the RAM 6, so that the incorrect symbols stored in the RAM 6 are corrected.

Figure 2:
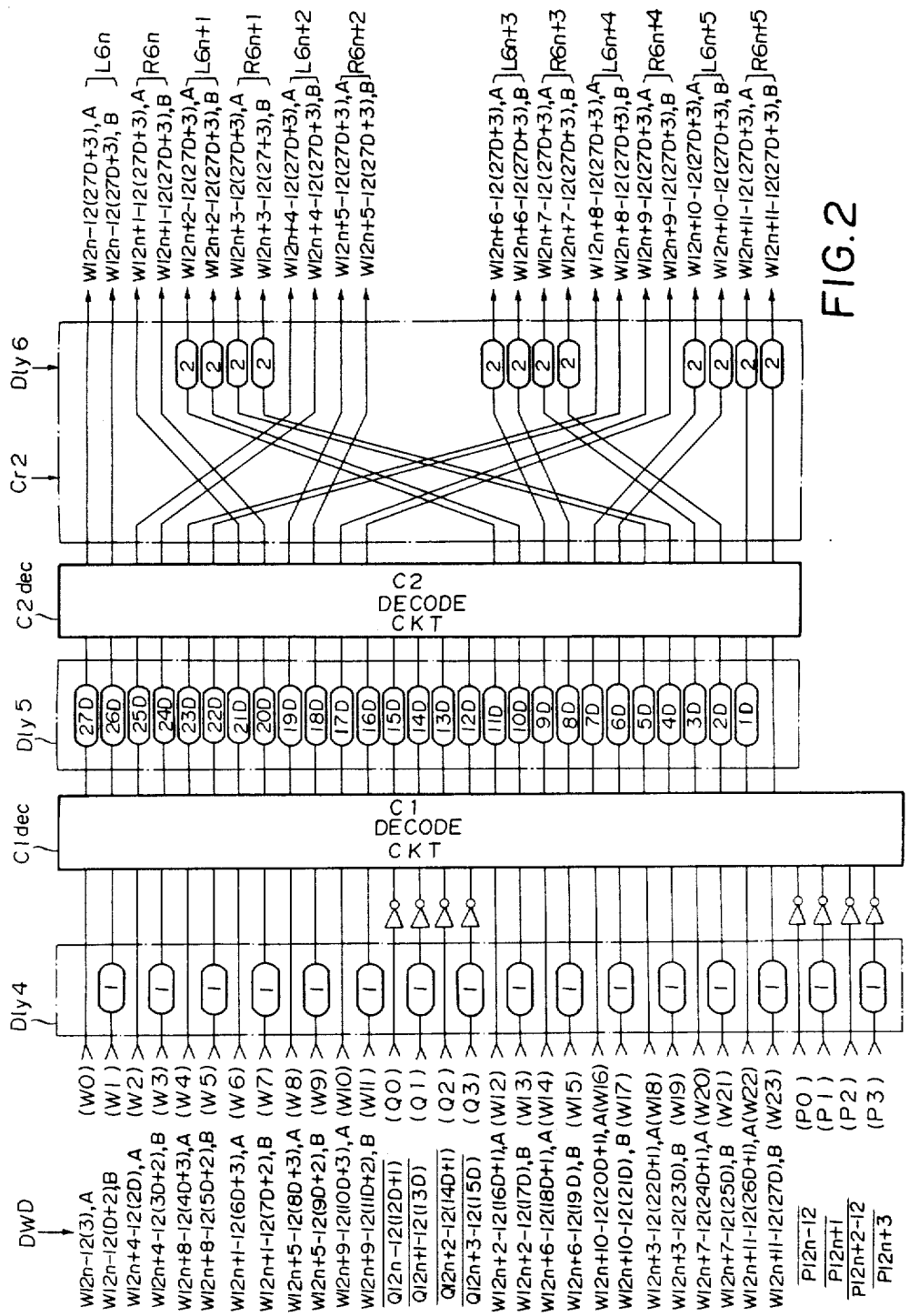

At the C2 decoding, the same operation as described for the C1 decoding is performed. However, although the total of the symbols W0 to W23, Q0 to Q3 and P0 to P3 inputted into the date error detection and correction circuit 8 at the C1 decoding is 32, the total of the symbols W0 to W23 and Q0 to Q3 inputted into the data error detection and correction circuit 8 at the C2 decoding is 28 (FIG. 2). In the data error detection and correction circuit 8, the musical signal data W0 to W23 and the correction parity data Q0 to Q3 and P0 to P3 are not distinguished from each other. Therefore, even errors in the correction parity data Q0 to Q3 and P0 to P3 can be detected.

The error flag detection circuit 10 produces C1 flags in accordance with flags E0 to E2 and NE2 outputted from the data error detection and correction circuit 8 at the time of C1 decoding, and outputs them to the data bus DABS2. At this time, the address control circuit 1 outputs address data ADS, representative of the addresses of the RAM 6 into which the C1 flags are to be written, to the RAM 6. C1 flag is rendered "1" when there is a good possibility that any error is contained in each of the symbols W0 to W23, Q0 to Q3 and P0 to P3 after the C1 decoding. On the other hand, C1 flag is rendered "0" when there is little possibility that any error is contained in each of these symbols. During the C2 decoding by the data error detection and correction circuit 8, the error flag detection circuit 10 inputs thereinto C1 flags read from the RAM 6 under the control of the address control circuit 1, and the error flag detection circuit 10 produces C2 flags based on C1 flags and the flags E0 to E2 and NE2 produced from the data error detection and correction circuit 8 at the time of C2 decoding, and outputs the C2 flags to the data bus DABS2. At this time, the address control circuit 1 feeds address data ADS, representative of the addresses of the RAM 6 into which C2 flags are to be written, to the RAM 6. C2 flag is a flag indicating whether each of the symbols W0 to W23 has been corrected or not, that is to say, whether there is a good possibility that the symbol has been corrected. If the symbol concerned has not yet been corrected, "1" is written into the RAM 6 as C2 flag.

A flag detection circuit 11 serves to check the above-mentioned C2 flags. More specifically, when the C1 decoding and the C2 decoding are completed, the symbols W0 to W23 as well as C2 flags are sequentially read from the RAM 6 under the control of the address control circuit 1 and are fed to parallel-to-serial converter circuit 12 via the data bus DABS2. At this time, the flag detection circuit 11 checks C2 flag added to each of the symbols W0 to W23 to determine whether the symbol has been corrected or not, and if the symbol has not yet been corrected, the flag detection circuit 11 outputs a control signal TEI to a correction circuit 13. The correction circuit 13 checks the data fed from the parallel-to-serial converter circuit 12 in accordance with the control signal TEI to determine whether it has not been corrected, and if the data has been corrected, the correction circuit 13 outputs the same data as its input data. On the other hand, if the data has not been corrected, the correction circuit 13 corrects the data by Linear Interpolation or Previous Data Hold Technique method and outputs the thus corrected data to the serial-to-parallel converter circuit 14. The serial-to-parallel converter circuit 14 converts the serial data, fed from the correction circuit 13, into parallel data and feeds them to the DAC (nct shown). The output of the DAC is fed to a loudspeaker to produce a musical signal. A timing signal control circuit 15 generates clock pulses $\phi$ through a crystal oscillator 15a and outputs various control signals based on the clock pulses $\phi$, the clock pulses $\phi$ and the control signals being applied to the circuits of FIG. 4.

The foregoing is a brief description of the digital audio disc player shown in FIG. 4.

Buffer register 4 and Write control circuit 5

FIG. 5 is a block diagram showing the buffer register 4 and the write control circuit 5. Eight-bit shift register 4a stores the signal from EFM demodulation circuit 3 and shifts this signal from one stage to another in synchronism with the EFM clock pulses $\phi$o. A latch 4b serves to latch each bit output of the shift register 4a by a timing signal as later described and to convert serial data into parallel data. The outputs of the latch 4b are fed to 1st stage buffer 4c, 2nd stage buffer 4d and 3rd stage buffer 4e each comprising 8 buffer units each composed of a register R, OR gate OR and two AND gates ANa and ANb. Circles on a line connected to the input of each AND gate represent its input terminals, and the input terminals are called 1st input terminal, 2nd input terminal and so on from the left side of the drawings. Each of the respective registers R of the buffers 4c, 4d and 4e outputs data when the clock pulse $\phi$ fed from the address control circuit 1 goes high.

A timing signal generating circuit 5a comprises a first timing signal generator 5a-1 operable in synchronism with EFM clock pulses $\phi$o and a second timing signal generator 5a-2 operable in synchronism with the internal clock pulses $\phi$. The first timing signal generator 5a-1 outputs a latch signal ru when eight EFM clock pulses $\phi$o are fed thereto after the symbol synchronization signal DSY goes high. Also, the first timing generator 5a-1 feeds a timing signal T' (FIG. 6) to the second timing generator 5a-2. The second timing signal generator 5a-2 outputs a timing signal T a predetermined period of time after the timing signal T' is applied thereto. AN1 to AN9 designate AND gates, OR1 to OR4 OR gates, and Lo and R1 to R3 registers. The registers Lo and R1 to R3 output their contents when the clock pulse φ goes high. A gate circuit 7 is composed of eight MOSFETs (MOS field-effect transistors).

The operations of the buffer register 4 and write control circuit 5 will now be described with reference to FIGS. 5 and 6.

In the first place all of the registers have been cleared. The serial data are fed sequentially from the EFM demodulation circuit 3 to the shift register 4a, and when the eighth bit is applied to the shift register 4a, the first timing signal generator 5a-1 outputs the latch signal ru to the latch 4b so that the latch 4b latches each bit output of the shift register 4a. Then, the first timing signal generator 5a-1 outputs the timing signal T' a predetermined period To of time after it outputs the latch signal ru. The time period To is so determined that the data signal outputted from the latch 4b is rendered stable before this time period To lapses. For example, the time period To corresponds to a period of two to three EFM clock pulses φo. Also, the timing signal T' is held in the 1 state for a predetermined period of time as hereinafter more fully described. When the timing signal T' is outputted from the first timing signal generator 5a-1 by the clock pulse φ, the second timing signal generator 5a-2 outputs the timing signal T at the time when the next clock pulse φ goes high. When the timing signal T is outputted, the input terminals of AND gate AN2 are all rendered "1", so that this AND gate feeds a signal LOAD at its output terminal (FIG. 6-g). When the signal LOAD is outputted, the output signal of AND gate AN4 is rendered "1", and "1" is stored in a register Rl when the second clock pulse φ during the "1" state of signal T goes high, and the second input terminals of the AND gates ANb of the first stage buffer 4c are all rendered "1", so that the bit outputs of the latch 4b are fed to the respective registers R of the first stage buffer 4c via the respective AND gates ANb. Thus, at this time, the data in the latch 4b are fed to the first stage buffer 4c. When "1" is stored in the register R1, the output signal of an inverter INV1 is rendered "0" so that the signal LOAD is rendered "0". During a time period when the timing signal T is being outputted, "1" is always stored in the register Lo since the output of the register Lo is fed back to the second input terminal of AND gate AN1. And, when "1" is stored in the register Lo, the output signal of inverter INV2 inhibits the signal LOAD to be outputted. Therefore, during a time period when the timing signal T is being outputted, the signal LOAD will not be outputted any more. In other words, the data in the latch 4b are not fed to the first stage buffer 4c more than once.

For better understanding, a mention will be made of the data fed to the first stage buffer 4c and the register R1. According to the above-mentioned procedure, each register R of the first stage buffer 4c stores the data fed from the latch 4b, and "1" is stored in the register R1. At this time, since the output signal B2 of register R2 is in the 0 state, the signal at the second input terminal of each AND gate ANb of the second stage buffer 4d is in the 1 state. As a result, the output signals of the registers R of the first stage buffer 4c are fed to the respective registers R of the second stage buffer 4d via the respective AND gates ANb, and when the third clock pulse φ during the 1 state of signal T goes high, the signal B2 is rendered "1", and at the same time the data is loaded onto each register. Also, when the signal B2 is in the 0 state, the output signals of the AND gates ANa of the first stage buffer 4c are "0". Therefore, all of the registers R of the first stage buffer 4c are cleared when the third clock pulse φ goes high. In other other words, the data in the first stage buffer 4c are transferred to the second stage buffer 4d, with the first stage buffer being cleared. In this case, similarly, the output signal Bl ("1") of the register R1 is fed to the register R2 via AND gate AN6 so that "1" is stored in the register R2 with the register R1 being cleared. Then, when the fourth clock pulse φ during the 1 state of signal T goes high, the data in the second stage buffer 4d are transferred to the third stage buffer 4e, with the second stage buffer 4d being cleared. At this time, register R3 is rendered "1" while the register R2 is rendered "0". When control signal EFMD is fed to the second input terminal of AND gate AN9 at a predetermined timing, the output signal of the AND gate AN9 which serves as control signal WE is rendered "1". As a result, the gate 7 is opened so that the data in the third stage buffer 4e is fed to the data bus DABSl (FIG. 4) via the gate 7. At this time, the output signal of AND gate AN7 is rendered "0", so that the register R3 is rendered "0" when the next clock pulse φ goes high. As mentioned above, the data latched by the latch 4b are transferred from one buffer to another or later-stage buffer, and each of the registers R1 to R3 is rendered "1" when the data is stored in the buffer corresponding to it, and vice versa.

The manner in which the data is to be transferred from one buffer state to a later-stage buffer storing data will now be described. For example, when data is to be transferred from the first stage buffer 4c to the second stage buffer 4d storing data, the output signal of the inverter INV3, or the signal at the second input terminals of the AND gates Anb of the second stage buffer 4d, is rendered "0" since the output signal of the register R2 is in the "1" state. Therefore, the data in the registers R of the first stage buffer 4c are not fed to the respective registers R of the second stage buffer 4d. Also, at this time, the signal B2 in the first stage is fed to the first input terminals of the AND gates ANa of the first stage buffer 4c, and the output signals of the registers R are fed back to the second input terminals of the AND gates ANa, respectively. Therefore, at this time, each register R of the first stage buffer 4c retains its contents. Thus, when the later-stage buffer is not empty, the data are not transferred from the preceding buffer to the later-stage buffer, and the preceding buffer continues to store its contents.

Figure 6:
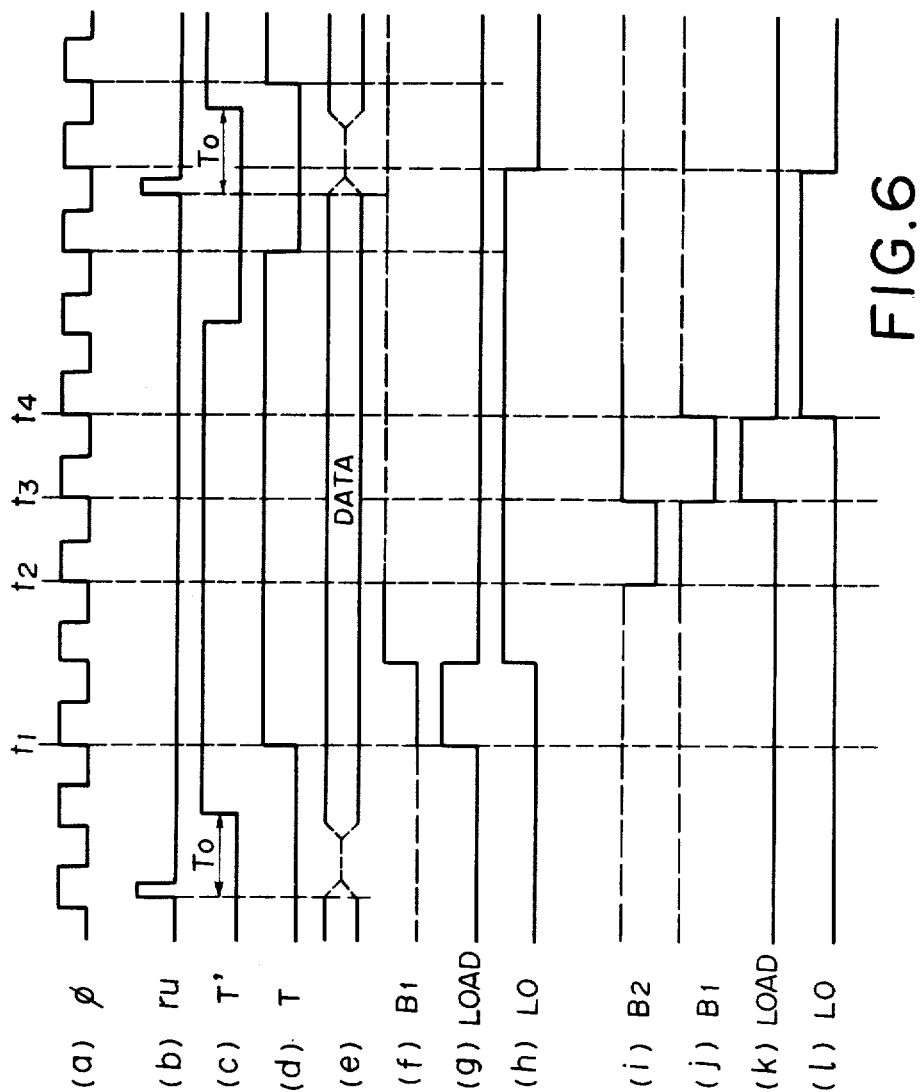
FIG. 6 is a timing chart of the various signals appearing in the circuits of FIG. 5.

FIG. 6-(i) to (l) shows the waveforms of the signals B2, Bl, LOAD and LO when the timing signal T is being outputted with the first stage and second stage buffers 4c and 4d storing data. At time tl, the signals B2 and Bl are both in the "1" state. At time t2 when the clock pulse φ goes high, the data in the second stage buffer 4d are transferred to the third stage buffer 4e, and the signal B2 is rendered "0". At time t3 when the next clock pulse φ goes high, the data in the first stage buffer 4c are transferred to the second stage buffer 4d, and the signal Bl is rendered "0". Then, when the signal B1 is rendered "0", the output signal of the inverter INV1 is rendered "1". As a result, the load signal LOAD is outputted from the AND gate AN2, and the data in the latch 4b are transferred to the first stage buffer 4c. In this case, the output signal LO of the register Lo (FIG. 6-l) is rendered "1" at time t4 when the next clock pulse φ goes high.

As mentioned above, the timing at which the signal LOAD (FIG. 6-g) is outputted when the first stage buffer 4c is empty (FIG. 6-f to h) is different from the timing at which the signal LOAD (FIG. 6-k) is outputted when the first stage and second stage buffers 4c and 4d are not empty (FIG. 6-i to l).

When the timing signal T' goes low, the timing signal T also goes low at the time when the next clock pulse φ goes high. The time period when the timing signal T is held in the "1" state, that is, the time period when the timing signal T' is held in the "1" state, lapses before the next latch signal ru is outputted, or before the symbol synchronization signal DSY is fed, and this time period is long enough to enable the transferring of the data to the first stage buffer 4c. As described above, the output signal of the AND gate AN9 is fed as the control signal WE to the gate circuit 7 and the RAM 6 and also fed as control signal VSYMB to the address control circuit 1.

The foregoing is a detailed description of the buffer register 4 and write control circuit 5. The address control circuit 1 constituting an embodiment of the present invention will now be described.

Address Control Circuit 1

First, a basic concept of the address control of the RAM 6 will be described using a simple model.

Figure 7:
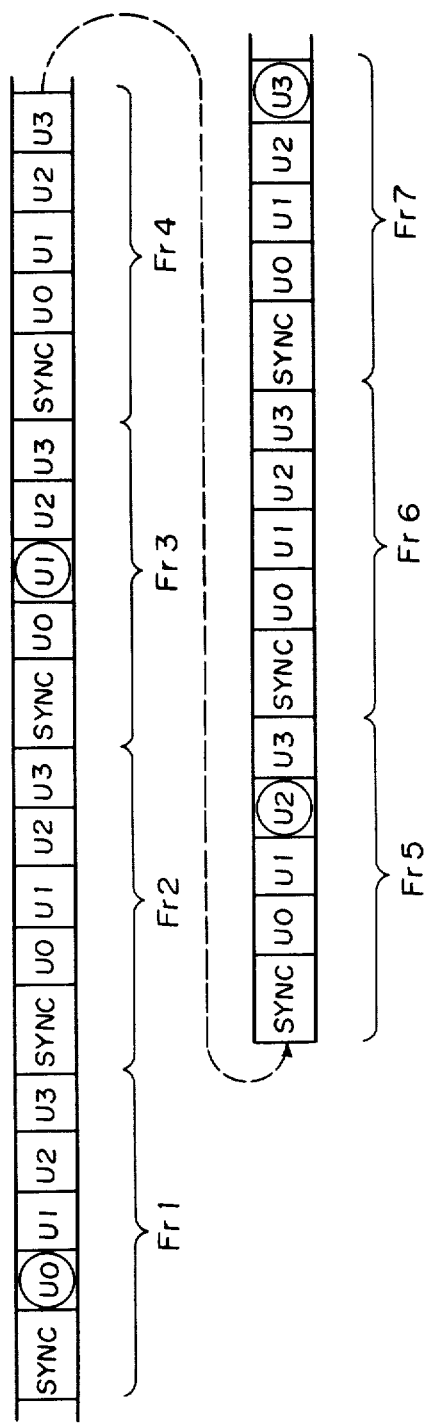
FIG. 7 is an illustration of a format of the data recorded on the disc explaining a basic concept of the present invention in a simpler manner.

It is assumed that each frame Fr contains four symbols U0 to U3 as shown in FIG. 7 and that the symbols U0 to U3 are delayed by 0, 2, 4 and 6 units of delay time, respectively, and stored in the disc.

Also, it is assumed that the delay operations by the delay portions Dly1 and Dly3 (FIG. 1) and the changing operation by the cross portion Cr 1 (FIG. 1) are omitted. In this case, the original symbols which have not yet been subjected to the delay operation, that is to say, the symbols corresponding to the left end symbols in FIG. 1, are stored in the disc in spaced relation and indicated by a circle in FIG. 7. Therefore, in order to effect the C2 decoding, or to output each symbol to DAC, there are required symbols U0 to U3 stored respectively in the frames which are 6, 4, 2 and 0 frames before, respectively. In other words, it is necessary that the RAM 6 should have 7, 5, 3 and 1 areas (each comprising 8 bits) for storing symbols U0 to U3 respectively read from the disc 6, 4, 2 and 0 frames before. In this embodiment, the writing of the symbols read from the disc, the processing of the symbols in the RAM 6 such as the C1 and C2 decoding, and the outputting of the symbols to DAC are effected in a time sharing manner. Therefore, the RAM 6 has one area for writing each of the symbols U0 to U3 and one area for outputting each symbol to DAC. The RAM 6 also has the above-mentioned 7, 5, 3 and 1 areas for processing the symbols. Therefore, in this model, 9, 7, 5 and 3 areas are necessary for symbols U0 to U3, respectively. Thus, the RAM 6 has a capacity of 24 areas.

Figure 8:
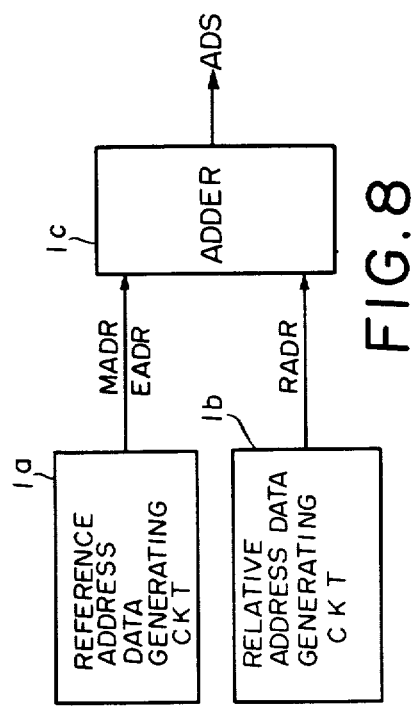
FIG. 8 is a block diagram of a portion of an address control circuit provided in accordance with the present invention.

FIG. 8 shows block diagram of the address control circuit 1. A reference address data generating circuit 1a outputs reference address data EADR and reference address data MADR. The reference address data EADR is used for writing symbols U0 to U3, fed from the buffer register 4, to the RAM 6. The reference address data MADR is used for processing the symbols U0 to U3 or for outputting the processed symbols to DAC. A relative address data generating circuit 1b produces relative address data RADR, and an adder 1c adds the relative address data RADR to the reference address data EADR or to the reference address data MADR. The output of the adder 1c is fed as the address data ADS to the address terminal AD of the RAM 6.

The address control will now be described.

(i) Control of Writing of the Symbols U0 to U3

FIG. 9(a) diagrammatically shows the areas of the RAM 6, and reference numerals 0 to 23 designate the absolute addresses of the areas while reference numerals <0> to <8> designate the relative addresses.

Figure 9:
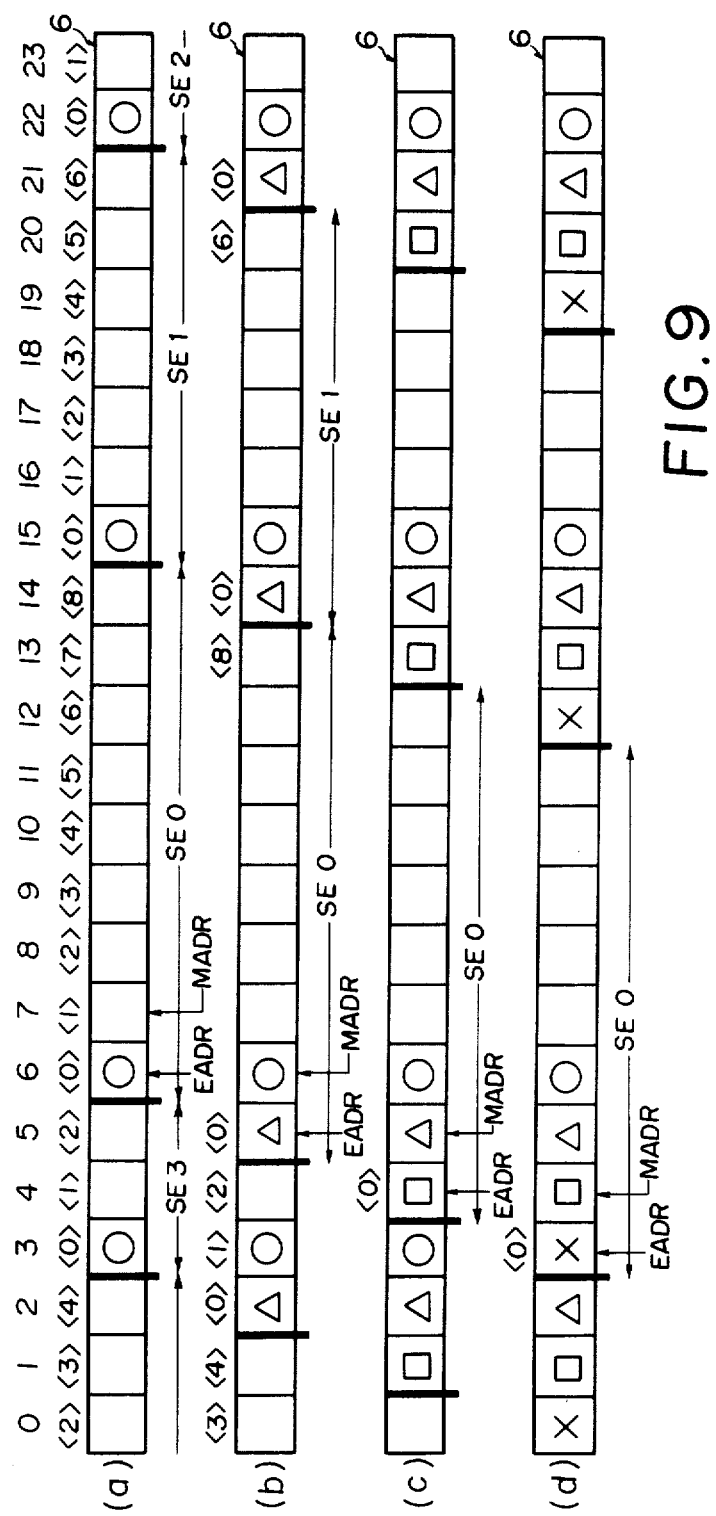
FIGS. 9-(a) to 9-(d) are illustrations of RAM 6 explaining the basic concept of the present invention.

The writing of symbols U0 to U3 to the RAM 6 is effected in the following manner. First, one area, for example, one representative of the absolute address 6 (FIG. 9-a) is selected as the reference address EADR. Then, 9 areas counting from this reference address EADR, i.e., the absolute addresses 6 to 14, are determined to be a relative region SE0, and the next 7 areas, i.e., the absolute addresses 15 to 21, are determined to be a relative region SE1, and the next 5 areas, i.e., the absolute addresses 22, 23, 0, 1 and 2, are determined to be a relative region SE2, and the next 3 areas, i.e., the absolute addresses 3 to 5, are determined to be a relative region SE3. Then, symbols U0 to U3 fed from the buffer register 4 are sequentially written into the leading addresses of the relative regions SE0 to SE3, i.e., the relative addresses <0> in which a circle is marked for illustration purposes. Then, when the EFM frame synchronization signal VFSYNC is supplied to the address control circuit 1, the reference address EADR is shifted to the preceding address as shown in FIG. 9-b, so that the relative regions SE0 to SE3 are correspondingly shifted by one address. In this condition, symbols U0 to U3 fed from the buffer register 4 are sequentially written into the relative addresses <0> of the relative regions SE0 to SE3. Then, the above procedure is repeated as shown in FIG. 9-c and d.

By repeating the above procedure, 8 symbols U0, 6 symbols U1, 4 symbols U2 and 2 symbols U3 are always stored in the relative regions SE0, SE1, SE2 and SE3, respectively. Also, symbols U0 to U3 are sequentially written into the relative addresses <0> of the relative regions SE0 to SE3. When the reference address EADR coincides with the absolute address 0, the absolute address 23 becomes the reference address EADR upon supply of the EFM frame synchronization signal VFSYNC to the address control circuit 1.

Therefore, the relative addresses RADR for writing symbols U0 to U3 into the RAM 6, respectively, are determined to be "0", "9", "9+7=16" and "9+7+5=21". Therefore, these values "0" to "21" have previously been stored in the relative address data generating circuit 1b. When the sum of the reference address EADR and the relative address RADR is "24", "25" and so on, it must be amended to "0", "1" and so on. However, in a binary operation, such an amendment can be easily carried out without performing a carry operation.

(ii) Control of Reading of the Symbols at C1 and C2 Decoding

Figure 10:
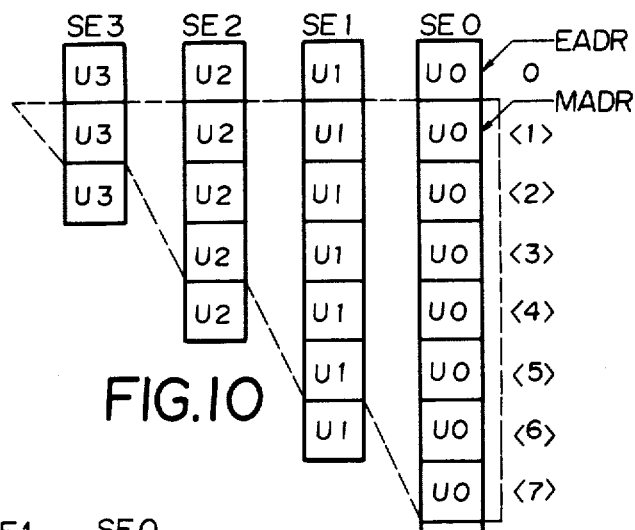
FIG. 10, is an illustration of the relative regions SE0 to SE3 of the RAM 6 of FIGS. 9-(a) to 9-(d)

FIG. 10 diagrammatically shows the relative regions SE0 to SE3 of FIG. 9 arranged in columns. In FIG. 10, symbols U0 to U3 are written into the relative addresses <0> of the relative regions SE0 to SE3 as described above, and when the writing of the symbols in one frame Fr is completed, all the symbols in the relative regions SE0 to SE3 are shifted by one area downwardly (FIG. 10) before the writing of the symbols in the next frame Fr is started. This will be appreciated from FIG. 9. The C1 decoding and C2 decoding are carried out in accordance with the symbols in the relative addresses of the relative regions SE0 to SE3 greater than the relative address <0> as indicated in a broken line in FIG. 10. More specifically, in order to effect the C1 decoding (see FIG. 2), the symbols in the relative addresses <1> of the relative regions SE0 to SE3 are sequentially read therefrom, and in order to effect the C2 decoding, the symbols in the relative address <7> of the relative region SE0, the relative address <5> of the relative region SE1, the relative address <3> of the relative region SE2 and the relative address <1> of the relative region SE3 are read out.

The address control of the above writing and reading operations is carried out in the following manner.

First, the reference address data MADR is set at the area indicated in FIG. 10. At the time of the C1 decoding, the relative address data RADR represents "0", "9", "9+7=16" and "9+7+5=21" to read symbols U0 to U3, respectively. Also, at the time of C2 decoding, the relative address data RADR represents "0+6", "9+4", "16+2" and "21+0" to read symbols U0 to U3, respectively.

(iii) Control of Reading of the Symbols to Output them to DAC

The symbols enclosed by the broken line in FIG. 10 are under processing, and they can not be fed to DAC. Therefore, the symbols in the relative address <8> of the relative region SE0, the relative address <6> of the relative region SE1, the relative address <4> of the relative region SE2 and the relative address <2> of the relative region SE3 are outputted to DAC. In this case, the reference address data MADR is used, and the relative address data RADR represents "7", "14", "19" and "22" to read symbols U0 to U3, respectively.

The foregoing is the basic concept of the address control. This address control method can be used only when there is no jitter in the signals read from the disc, the jitter being the instability of the signal due to variations in the speed of rotation of the disc. Actually, however, there is such a jitter, and therefore the address control can not be carried out properly based on the foregoing address control method. The reason for this will now be described.

In the first place, the processing of the symbols in one frame Fr in the RAM 6, such as the C1 and C2 decodings, and the outputting of the symbols to DAC are carried out within a predetermined frame-processing period of time based on the internal clock pulses $\phi$ produced by a crystal oscillator. At the end of this frame-processing period, an internal frame synchronization signal XFSYNC is outputted. Theoretically, the internal frame synchronization signal XFSYNC synchronizes with the above-mentioned EFM frame synchronization signal VFSYNC. More specifically, the rotation of the disc is controlled to be in synchronism with the internal frame synchronization signal XFSYNC. Actually, however, variation in the rotation of the disc develops due to a delay in the response of a system for controlling the rotation of the disc. As a result, there develops a jitter in the signal read from the disc.

It is now assumed that the period of the EFM frame synchronization signal VFSYNC becomes shorter than the period of the internal frame synchronization signal XFSYNC. In this case, under the condition that the processing of the symbols in one frame Fr and the outputting of the symbols to DAC have not yet been completed, the writing of the symbols is again effected. More specifically, with reference to FIG. 10, the reference address EADR becomes smaller by one address before the processing of the symbols in one frame Fr and the outputting of the symbols to DAC are not completed. Therefore, each of the symbols in the relative regions SE0 to SE3 is shifted downwardly by one area. As a result, the symbols in the lowermost areas of the relative regions SE0 to SE3 are lost, so that the outputting of the symbols to DAC cannot be effected properly.

In contrast, if the period of the EFM frame synchronization signal VFSYNC becomes longer than the internal frame synchronization signal XFSYNC, the symbols of one frame Fr read from the disc begins to be processed before the writing of all the symbols of one frame Fr has not yet been completed. In other words, with reference to FIG. 10, the reference address MADR for the processing of the symbols coincides with the reference address EADR for the writing of the symbols, so that the processing of the symbols can not be carried out properly.

Figure 11:
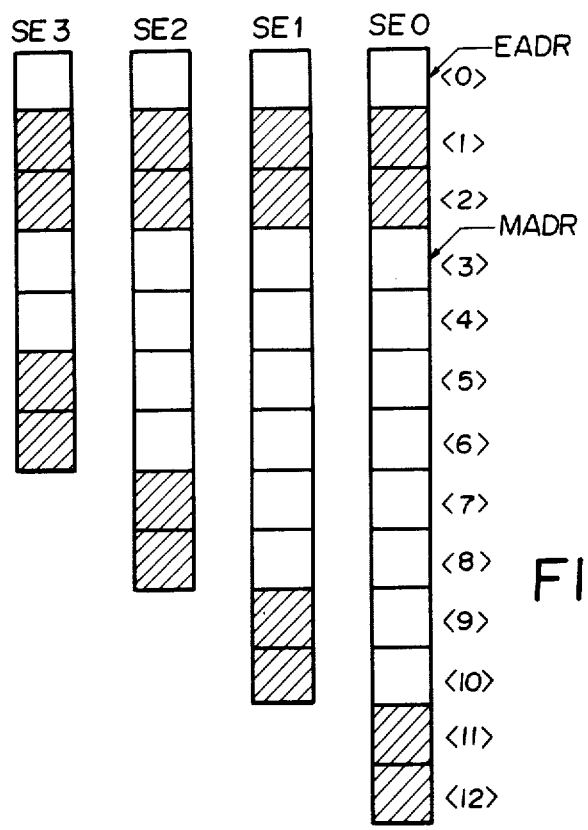
FIG. 11 is an illustration of the relative regions SE0 to SE3 of the RAM 6 having jitter-compensating areas.

Accordingly to the present invention, therefore, a plurality of areas for compensating for jitter are provided at upper and lower portions of the relative regions SE0 to SE3 (FIG. 11), these areas being indicated by a hatching. In this case, the reference address EADR for the writing of the symbols is always relative address <0> of the relative region SE0 as described for FIG. 10. The symbols read from the disc are written into the relative addresses <0>. Also, the reference address MADR for the processing of the symbols is determined to be the relative address <3> of the relative region SE0 (EADR+3) when there is no jitter (FIG. 11). In an embodiment hereinafter described, four areas for compensating for jitter are provided at each of the upper and lower portions of each relative regions, and the reference address MADR when there is no jitter is EADR+4. With this arrangement, even if the period of the EFM frame synchronization signal VFSYNC becomes shortened so that each symbol is shifted downwardly (FIG. 11), the symbol to be outputted to DAC will not be lost. Also, even if the period of the EFM frame synchronization signal VFSYNC becomes longer so that the reference address MADR is shifted upwardly (FIG. 11), the reference address MADR will not overlap the reference address EADR.

The foregoing is a basic concept of the address control.

Figure 12:
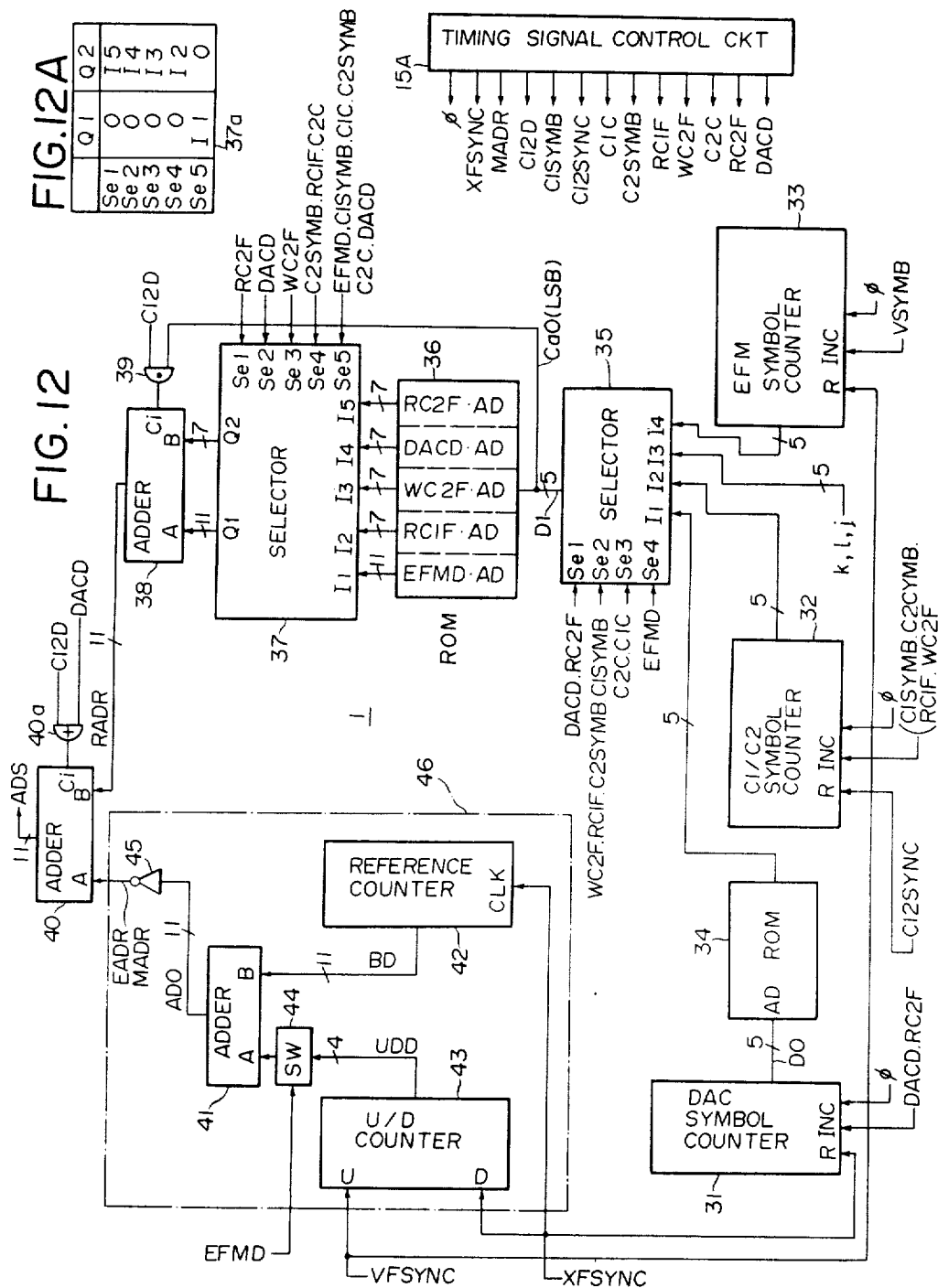
FIG. 12 is a block diagram of the address control circuit 1 provided in accordance with the present invention.

The address control circuit 1 will now be described in detail with reference to FIGS. 12 to 20. FIG. 12 shows a block diagram of the address control circuit 1, and the construction of the address control circuit 1 will be first described.

Construction of Address Control Circuit 1

Each of DAC symbol counter 31, C1/C2 symbol counter 32 and EFM symbol counter 33 is a 5-bit binary counter, and when "1" signal is applied to its reset terminal R, each counter is reset. Also, when "1" signal is applied to its increment terminal INC, the contents of each counter is subjected to increment upon application of a clock pulse $\phi$ thereto. ROM 34 serves to convert an output D0 of the DAC symbol counter 31, applied to its address terminal, into another value, and the contents of the ROM 34 are shown in FIG. 13. Selector 35 selectively outputs one of the data applied to its input terminals I1 to I4, and when "1" signal is applied to each of its selection terminals Se1 to Se4, the selector 35 outputs a respective one of the data applied to its input terminals I1 to I4. ROM 36 has memory regions 36a to 36e each composed of 32 areas. The contents in the memory regions 36a to 36e are shown in FIG. 14. The output data D1 of the selector 35 is fed to an address terminal of the ROM 36, and the data in the areas of the memory regions 36a to 36e designated by the output data D1 of the selector 35 are read therefrom in parallel and fed to a selector 37. The data in the memory regions 36a to 36e are called EFMD.AD (EFMD address data), RC1F.AD, WC2F.AD, DACD.AD and RC2F.AD. The selector 37 selects one of the data applied to its input terminals I1 to I5 in accordance with a respective one of the signals fed to its selection terminals Se1 to Se5 and outputs it at its output terminals Q1 and Q2. The data outputted from the output terminals Q1 and Q2, when "1" signal is applied to each of the selection terminals Se1 to Se5, are shown in FIG. 12A. An adder 38 adds the data fed to its input terminals A and B, and an output signal of AND gate 39 is fed to a carry terminal Ci of the adder 38. A control signal C12D is fed to one input terminal of the AND gate 39 while the LSB of the data D1 (hereinafter referred to as "signal CaO") is fed to the other input terminal of the AND gate 39. An adder 40 adds the data applied to its input terminals A and B, and an output of OR gate 40a is fed to a carry terminal Ci of the adder 40. An adder 41 adds the data applied to its input terminals A and B. A reference counter 42 is a 11-bit binary counter and counts up signals fed to its clock terminal CLK. U/D counter 43 is a 4-bit up/down counter, and counts up signals fed to its up count terminal U and counts down signals fed to its down count terminal D. The U/D counter 43 is initially set to "4", and its count output is one of "0" to "8". The adder 41, the reference counter 42, the U/D counter 43, a switching circuit 44 and an inverter 45 constitute a reference address data generating circuit 46. Reference numeral 15A designates that portion of the timing signal control circuit 15 which outputs the control signals for the address control circuit 1.

The operation of the address control circuit 1 will now be described with reference to FIGS. 15 to 18.

Operation of Address Control Circuit 1

Figure 15:
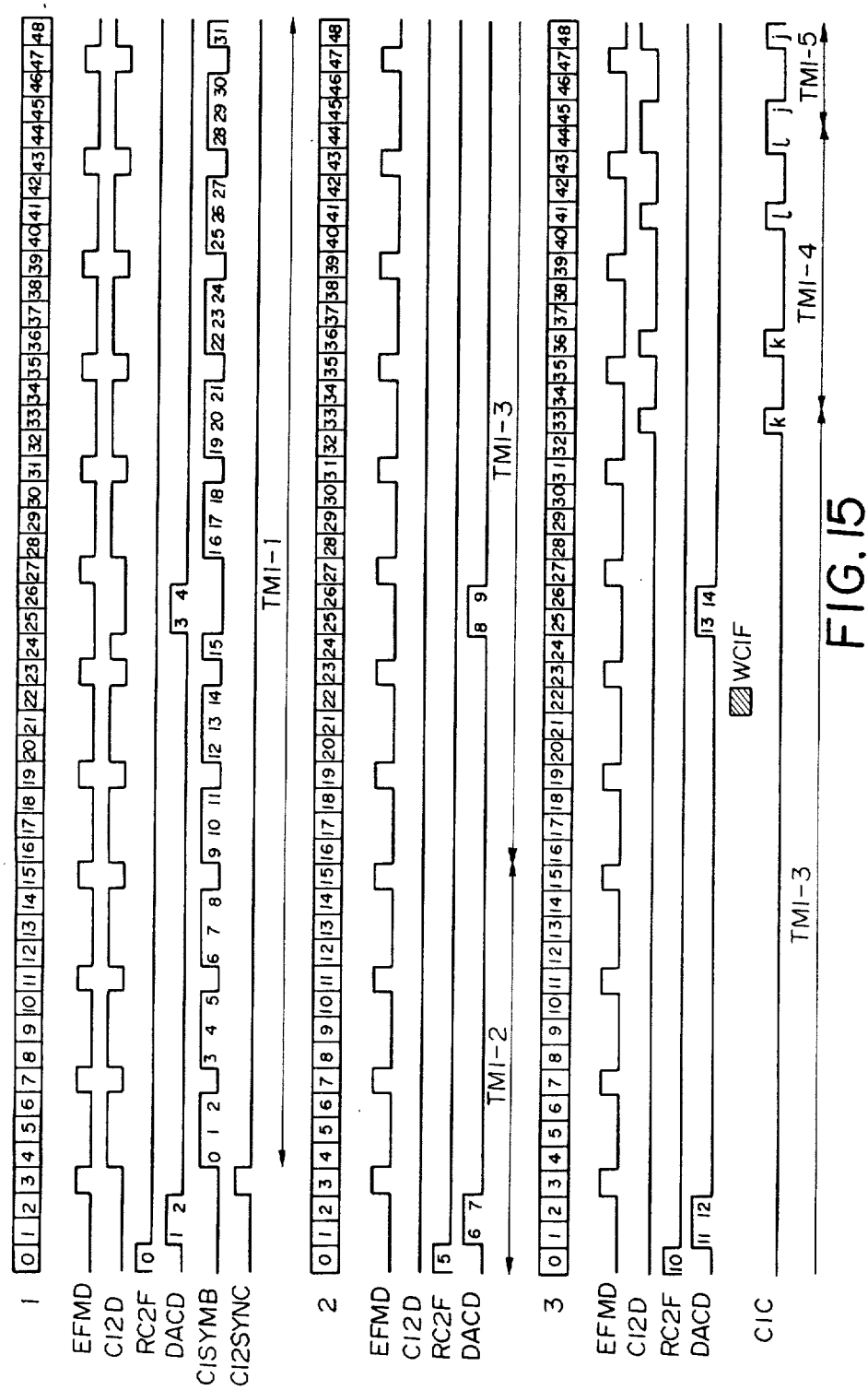
FIGS. 15 and 16 are timing charts for explaining the operation of the address control circuit 1 of FIG. 12.
Figure 16:
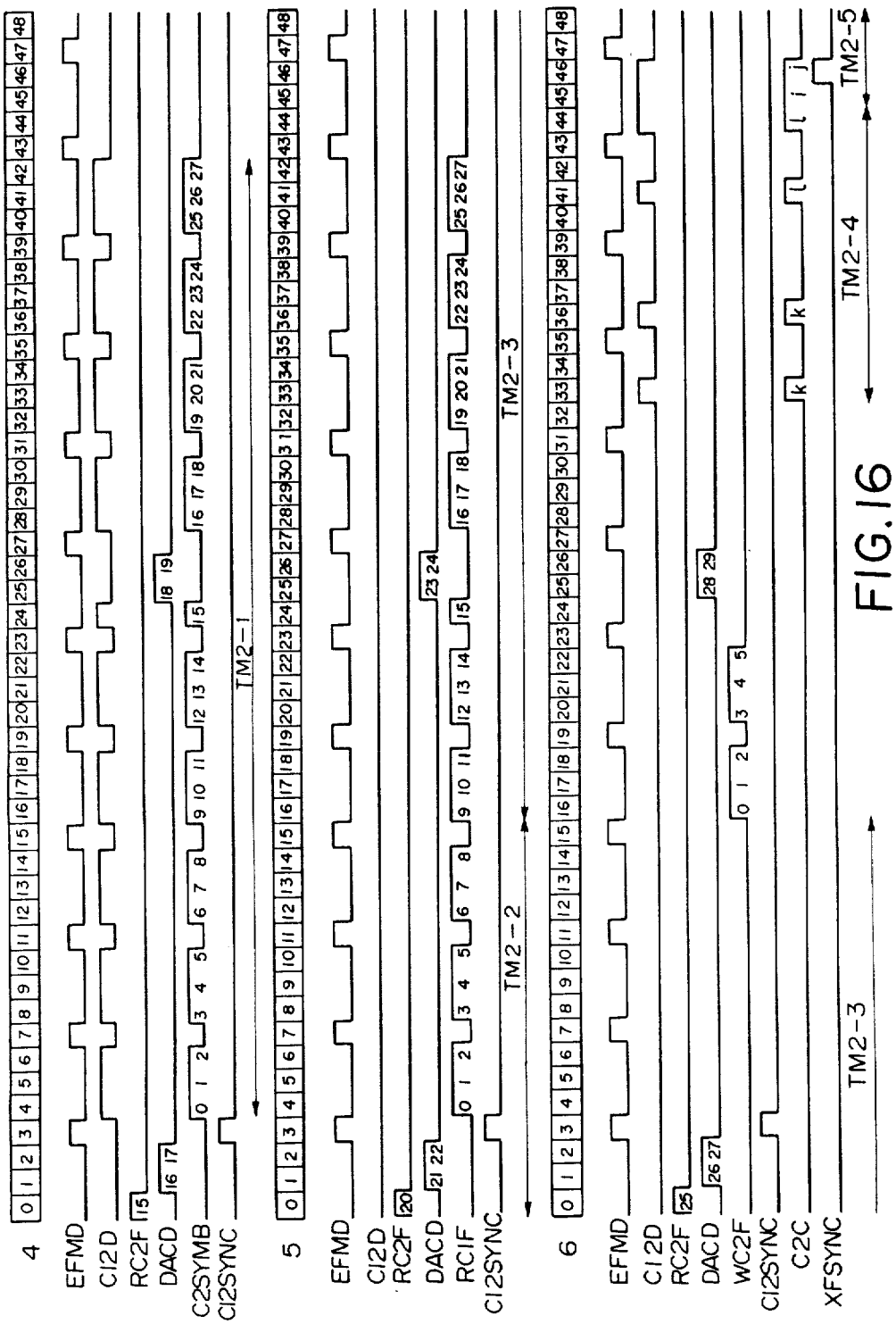

FIGS. 15 and 16 show a time chart for the address control circuit 1. For illustration purposes, the sequence of operation of the address control circuit 1 is shown in six rows 1 to 6 in FIGS. 15 and 16, but actually the time chart in FIGS. 15 and 16 is a continuous time chart. For example, time slot "0" of row 2 of FIG. 15 follows time slot "48" of row 1, and also time slot "0" of row 4 of FIG. 16 follows time slot "48" of row 3 of FIG. 15. The time slot of each row is hereinafter designated, for example, by time slot 1-28 wherein "1" actually denotes "row" and "28" denotes "time slot" of this row. The time chart is prepared based on the clock pulse φ.

Figure 17:
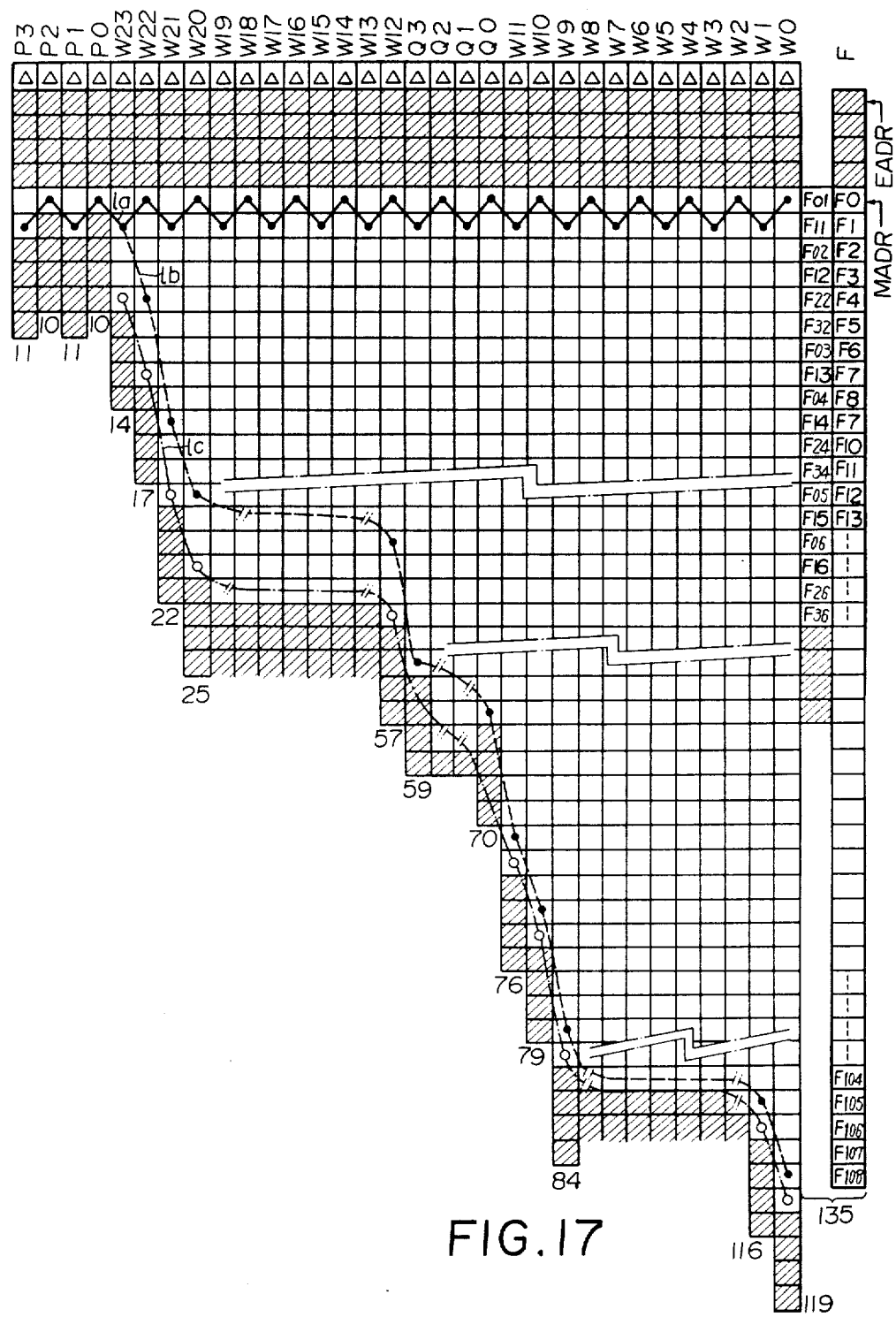
FIG. 17 is an illustration of RAM 6 in its normal condition.

The time chart shows the processing of the data in one frame Fr (one frame processing period). More specifically, the writing of the symbols and C1 and C2 decodings and the outputting of the symbols to DAC in one frame Fr are all carried out during 294 time slots (49×6). FIG. 17 schematically shows the relative regions of the RAM 6 in a manner described above for FIG. 11. The RAM 6 has 32 relative regions for writing symbols W0 to P3 thereinto, and an additional relative region (two rows counting from the right of FIG. 17) for writing C1 and C2 flags thereinto. The relative region for C1 and C2 flags has 109 areas for the writing of C1 flags, 18 areas for the writing of C2 flags and 8 areas for compensating for jitter. Thus, this relative area has a total of 135 areas. Also, the relative regions for writing symbols W0, W1 ----- P3, respectively, have 119 areas, 116 areas ----- 11 areas, respectively. The reason the relative region for writing symbol W0 has 119 areas is that there are required 109 areas for dealing with the delay of 108 delay units of time, 1 area for writing the symbol, 1 area for outputting the symbol to DAC, and 8 areas for absorbing the jitters.

The operation of the address control circuit 1 shown in FIG. 12 will now be described.

First, the reference address data generating circuit 46 will be described. The control signal EFMD applied to the switching circuit 44 is outputted substantially every four time slots as shown in FIGS. 15 and 16. At those time slots that the control signal EFMD is rendered "1", the circuit 46 outputs address data for writing the symbols in the buffer register 4 into the RAM 6, and at the other time slots, the circuit 46 outputs address data for reading the symbols from the RAM 6 and writing the symbols into RAM 6 to process them and for reading the symbols from the RAM 6 to output them to DAC. When the control signal EFMD is rendered "1", the switching circuit 44 is rendered operative so that the output of U/D counter 43 is fed to the input terminal A of the adder 41. As a result, the adder 41 outputs data UDD+BD representative of a sum of the output data UDD of the U/D counter 43 and the output data BD of the reference counter 42. Therefore, the inverter 45 outputs data $\overline{UDDBD}$ which is fed as the above-mentioned reference address data EADR to the input terminal A of the adder 40. On the other hand, when the control signal EFMD is "0", the output data AD0 of the adder 41 is data BD, and the inverter 45 outputs data $\overline{BD}$ which is fed as the above-mentioned reference address MADR to the adder 40.

The reference address data EADR and the reference address data MADR will now be described, assuming that the reference counter 42 is a 4-bit counter although it is actually an 11-bit counter. When the switching circuit 44 is in its OFF state (at the time of the processing of the symbols and the reading of the symbols from the RAM 6 to output them to DAC), the reference address data MADR ($\overline{BD}$) varies as shown in Table 1 when the output data BD of the reference counter 42 varies as shown in Table 1. More specifically, each time the reference counter 42 is incremented, the reference address MADR is shifted to the preceding address, i.e., the address which is one address smaller. When the switching circuit 44 is in its ON state (at the time of the writing of the symbols), and if the output data UDD of the U/D counter 43 represents "4", the output data AD0 of the adder 41 varies with the change of the output data BD of the reference counter 42, as shown in Table 1. As a result, the reference address data EADR varies as shown in Table 1. More specifically, each time the reference counter 42 is incremented, the reference address data EADR is shifted to the one address smaller address and is always smaller than the reference address MADR by a value of the data UDD.

TABLE 1

| BD | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| MADR | 15 | 14 | 13 | 12 | 11 | 10 | 9 | 8 | 7 | 6 | 5 | 4 | 3 | 2 | 1 | 0 |
| AD0 | 4 | 5 | 6 | 7 | 8 | 9 | 10 | 11 | 12 | 13 | 14 | 15 | 0 | 1 | 2 | 3 |
| EADR | 11 | 10 | 9 | 8 | 7 | 6 | 5 | 4 | 3 | 2 | 1 | 0 | 15 | 14 | 13 | 12 |

The reference counter 42 is incremented by the internal frame synchronization signal XFSYNC generated by the portion 15A of the timing signal control circuit 15. As is clear from FIGS. 15 and 16, the internal frame synchronization signal XFSYNC is generated at the end of one frame processing period, that is, at time slots 6-46. More specifically, the output data BD of the reference counter 42 does not vary within one frame processing period (except for time slots 6-47 and 6-48), and therefore the reference address data MADR also does not vary.

The U/D counter 43 is incremented by the EFM frame synchronization signal VFSYNC and decremented by the internal frame synchronization signal XFSYNC. As mentioned above, the synchronization signals VFSYNC and XFSYNC are not in synchronism with each other, and therefore the EFM frame synchronization signal VFSYNC is usually generated at an intermediate timing during one frame processing period. And, when the EFM frame synchronization VFSYNC is generated, the data UDD is incremented by "1", and therefore the reference address EADR is shifted to the one address smaller address. Then, when the internal frame synchronization signal XFSYNC is outputted, the data UDD is decremented by "1". At this time, the output data BD of the reference counter 42 is incremented by "1", and therefore the reference address EADR does not vary.

As described above, the reference address MADR is shifted to the one address smaller address each time the internal frame synchronization signal XFSYNC is outputted. Also, the reference address EADR is shifted to the one address smaller address each time the EFM frame synchronization signal VFSYNC is outputted.

Next, the address control of the address control circuit 1 will be described in detail.

(1) Control of Writing of the Symbols

The symbols in the buffer register 4 (FIG. 4) are written into the RAM 6 when the control signal EFMD is rendered "1" (FIGS. 15 and 16). The areas into which the symbols are written are the uppermost areas of the relative regions (FIG. 17) except for the relative region for writing the C1 and C2 flags.

First, when the receiver circuit 2 (FIG. 4) feeds the EFM frame synchronization signal VFSYNC to the EFM symbol counter 33 (FIG. 12), the counter 33 is reset so that its output data representative of "0" is fed to the input terminal I4 of the selector 35. In this condition, the control signal EFMD goes to the "1" state so that "1" signal is fed to the selection terminal Se4 of the selector 35. As a result, the output data representative of "0" is fed from the EFM symbol counter 33 to the ROM 36 via the selector 35 so that the data in addresses "0" of the memory regions 36a to 36e of the ROM 36 are fed to the input terminals I1 to I5 of the selector 37, respectively (FIG. 14). At this time, the control signal EFMD in the "1" state is being fed to the selection terminal Se5 of the selector 37. Therefore, as shown in FIG. 12A, the selector 37 outputs at its output terminal Q1 the data inputted to its input terminal I1, i.e., the data stored in address "0" of the memory region 36a of the ROM 36 and representing "135", and also the selector 37 outputs at its output terminal Q2 data representative of "0". Also, at this time, the control signal C12D fed to one input terminal of the AND gate 39 is in the "0" state as can be seen from FIGS. 15 and 16, so that the output signal of the AND gate 39 is in the "0" state.

As a result, the output data of the adder 38 representative of "135" is fed as the relative address data RADR to the input terminal B of the adder 40. At this time, both of the control signals fed respectively to both input terminals of the OR gate 40a are in the "0" state (FIGS. 15 and 16), and therefore the adder 40 outputs data EADR+RADR (EADR+135) which is fed as the address data ADS to the RAM 6.

As mentioned above, at the time slot when the control signal EFMD first goes to the 1 state after the EFM frame synchronization signal VFSYNC is outputted, the adder 40 outputs the address data EADR+135 to the RAM 6. Also, at this timing, if symbol W0 has been inputted into the third stage buffer 4e of the buffer register 4 (FIG. 5), the symbol W0 is outputted to the data bus DABSI (FIG. 4), and the control signal WE in the "1" state is fed to the read/write control terminal R/W of the RAM 6. Therefore, symbol W0 is written into address EADR+135 of the RAM 6. Also, at this time, the write control circuit 5 outputs the control signal VSYMB to the increment terminal INC of the EFM symbol counter 33, so that when the next clock pulse φ goes high, the EFM symbol counter 33 outputs data representative of "1".

On the other hand, at the timing when the control signal EFMD first goes to the "1" state after the EFM frame synchronization signal VFSYNC is outputted, if symbol W0 has not yet been inputted into the third stage buffer 4e of the buffer register 4, neither of the control signals WE and VSYMB are outputted, and therefore both of the writing of the RAM 6 and the increment of the EFM symbol counter 33 are not effected. In this case, at the timing when the control signal EFMD again goes to the "1" stage, the adder 40 again outputs the address data EADR+135.

It will be appreciated from the number of the areas of the relative regions for writing the flags, that is, 135 areas, that the address EADR+135 designates the uppermost areas of the relative regions for writing symbol W0 (FIG. 17).

In this manner, the writing of symbol W0 is effected, and the EFM symbol counter 33 outputs the data representative of "1". Then, at the timing when the control signal EFMD again goes to the 1 state, the data, stored in the address "1" of the memory region 36a of the ROM 36 and representing "254", is fed as the relative address data RADR to the adder 40, so that the adder 40 outputs address data EADR+254 to the RAM 6. At this time, if symbol W1 has been inputted in the third buffer 4e of the buffer register 4, the symbol W1 is written into address EADR+254 of the RAM 6. Here, "254" is a sum of "135" and "119" (254=135+119), and "119" is the number of the areas of the relative region for symbol W0 (FIG. 17), and address EADR+254 is the address representing the uppermost area of the relative region for symbol W1. Then, the above-mentioned procedure is repeated so that the writing of the symbols into the RAM 6 is effected.

As is clear from the foregoing, the address data ADS outputted from the adder 40 for writing the symbol is represented by the following formula (1):

$$ADS = EADR + EFMD.AD \,(xl) \tag{1}$$

wherein EFMD.AD (x1) represents the data EFMD.AD in address xl of the memory region 36a of the ROM 36 (data xl is outputted from the EFM symbol counter 33).

(2) Control of Reading of the Symbols at C1 Decoding

As can be appreciated from the delay portion Dly4 of FIG. 2, the C1 decoding is carried out by reading the symbols in the areas indicated by a solid line la in FIG. 17. The reading of the symbols at the C1 decoding is effected at the timings when the control signal C1SYMB is rendered "1".

At the timings when the control signal C1SYMB is rendered "1", "1" signal is applied to the selection terminal Se2 of the selector 35, so that the selector 35 outputs data D1 representative of the output data of the C1/C2 symbol counter 32. Also, "1" signal is applied to the selection terminal Se5 of the selector 37 so that the selector 37 outputs at its output terminal Q1 the data EFMD.AD in the relative region 36a of the ROM 36 and also outputs at its output terminal Q2 data representative of "0". Also, the signal C12D is rendered "1" so that the signal CaO is fed to the carry terminal Ci of the adder 38 via the AND gate 39. Further, since the signal C12D is rendered "1", "1" signal is fed to the carry terminal Ci of the adder 40.

First, when the control signal C12SYNC is outputted from the portion 15A of the timing signal control circuit 15 at the time slot 1-3 (FIG. 15), the C1/C2 symbol counter 32 is reset so that this counter outputs data representative of "0". Then, when the control signal C1SYMB is rendered "1" at the time slot 1-4, the data D1 representative of "0" is fed to the ROM 36. Therefore, the selector 37 outputs at its output terminal Q1 data representative of "135" to the input terminal A of the adder 38 (FIG. 14). At this time, the signal CaO is in the "0" state, and therefore the adder 38 outputs the relative address data RADR representative of "135", so that the adder 40 outputs the address data MADR+135+1. This address data MADR+135+1 is fed to the RAM 6 so that symbol W0 in the areas of the RAM 6 indicated by the solid line la is read therefrom and fed to the data error detection and correction circuit 8.

Then, at the leading edge of the time slot 1-5, the C1/C2 symbol counter 32 outputs data representative of "1". Therefore, at this the time slot 1-5, the selector 37 outputs data representative of "254" at its output terminal Q1, and the AND gate 39 outputs "1" signal. As a result, the adder 38 outputs data representative of "254+1", and the adder 40 outputs the address data MADR+254+1+1. Therefore, symbol W1 in the areas of the RAM 6 indicated by the solid line la is read therefrom. Then, each time the control signal C1SYMB is rendered "1", the above procedure is repeated. In this manner, 32 symbols necessary for the C1 decoding are sequentially read from the RAM 6.

The reason why the signal CaO is applied to the carry terminal Ci of the adder 38 is that the areas, indicated by the solid line la, from which the symbols are read, should be shifted by one area in accordance with the delay portion Dly4 (FIG. 2). Also, the reason why "1" signal is applied to the carry terminal Ci of the adder 40 is that the symbol in the area, disposed one area above the area (FIG. 17) from which the symbol to be read is stored, is read if "1" signal is not applied to the carry terminal Ci of the adder 40.

The address data ADS is represented by the following formula (2):

$$ADS = MADR + EFMD.AD\ (x2) + CaO + 1 \quad (2)$$

wherein x2 is the output data of the C1/C2 symbol counter.

The operation of the data error detection and correction circuit 8 and error flag detection circuit 10 will now be described briefly. The data error detection and correction circuit 8 calculates syndromes, detects a single data error, detects a double data error, corrects the double data error and corrects the single error at respective periods TM-1 to TM-5 (FIG. 15). At the time of detecting the single error and the double error, the circuit 8 outputs error flags E0, E1, E2 and NE2 to the error flag detection circuit 10. Also, the circuit 8 outputs data k representative of the position of an incorrect symbol at the time slots 3-33 and 3-36, data representative of the position of an incorrect symbol at the time slots 3-41 and 3-44 and data j representative of the position of an incorrect symbol at the time slots 3-45 and 3-48 to the address control circuit 1 (see the the timings of the control signal C1C in FIG. 15). The data k and l represent the positions of double data errors, and the data j represents the position of a single error. The error flag detection circuit 10 produces the C1 flag in accordance with the error flags E0 to E2 and NE2 and outputs it to the data bus DABS1 at the time slot 3-22 (see reference character WC1F).

(3) Control of Writing of the C1 Flag

At the time slot 3-22, the C1 flag is written into the area indicated by reference character F0 (FIG. 17), i.e., the area designated by the reference address data MADR. More specifically, at the time slot 3-22, the control signals fed respectively to the selection terminals Se1 to Se5 of the selector 37 are in the "0" state so that "0" signal is outputted from each of its output terminals Q1 and Q2. At this time, the output signal of the AND gate 39 is also rendered "0". As a result, the adder 38 outputs the relative address data RADR representative of "0". Also, at this time slot 3-22, the output of the OR gate 40a is rendered "0", so that the adder 40 outputs the reference address data MADR to the RAM 6.

Thus, the C1 flag is written into the RAM 6 only once during one frame processing period. As is clear from the fact that there are provided 109 areas for writing the C1 flags, the C1 flags which have been produced at the preceding 108 frame processing periods have been stored in the respective areas. When the C2 flag is produced in the error flag detection circuit 10, 28 C1 flags out of 109 C1 flags per one frame Fr are checked.

(4) Control of Reading/Writing at the Time of Correcting of The C1 Error

As described above, the C1 decoding is carried out using the symbols in the areas indicated by the solid line la in FIG. 17. When a symbol error is detected, the incorrect symbol is first read from the RAM 6, and the correction of this incorrect symbol is effected in the data error detection and correction circuit 8. Then, the corrected symbol is again written into the area of the RAM 6 from which the incorrect symbol has been read.

More specifically, when the control signal C1C is rendered "1" at the time slot 3-33, "1 signal is applied to the selection terminal Se3 of the selector 35 so that the selector 35 outputs data D1 representative of the data fed to its input terminal I3. As described above, at the time slot 3-33, the data error detection and correction circuit 8 outputs data k to the input terminal I3 of the selector 35. Therefore, at the time slot 3-33, the data k is applied to the ROM 36. Also, at this time slot 3-33, "1" signal is fed to the selection terminal Se5 of the selector 37. Further, at this time slot 3-33, the signal C12D is in the "1" state, and therefore the signal CaO (the LSB of the data k) is fed to the carry terminal Ci of the adder 38, and "1" signal is fed to the carry terminal Ci of the adder 40.

As a result, the output ADS of the adder 40 at the time slot 3-33 is represented by the following formula (3):

$$ADS = MADR + EFMD.AD\ (k) + CaO + 1 \qquad (3)$$

The address data ADS is fed to the RAM 6, so that the incorrect symbol corresponding to the data k is read from the RAM 6 and is fed to the data error detection and correction circuit 8. Three time slots later, that is, at the time slot 3-36, the data error detection and correction circuit 8 outputs the corrected symbol to the data bus DABS1 and again outputs the data k to the address control circuit 1.

On the other hand, the control signal C1C is again rendered "1" at the time slot 3-36, and therefore at this time slot the address data ADS represented by the formula (3) is again fed to the RAM 6. At this time, "1" signal is fed to the read/write terminal R/W of the RAM 6, so that the corrected symbol is written into the area from which the symbol has been read.

Then, at the time slots 3-41, 3-44, 3-45 and 3-48, the above procedure is repeated, so that the symbol correction is effected in accordance with the data l and j.

(5) Control of Reading of the Symbols at C2 Decoding

It will be appreciated from the delay processing at the delay portions Dly4 and Dly5 (FIG. 2) that the C2 decoding is carried out by reading the symbols from the areas indicated by a broken line lb in FIG. 17. The reading of the symbols at the C2 decoding is effected at the timings when the control signal C2SYMB is rendered "1" (FIG. 16).

At these timings when the control signal C2SYMB is rendered "1", "1" signal is fed to the selection terminal Se2 of the selector 35, so that the output data of the C1/C2 symbol counter 32 is fed to the ROM 36 via the selector 35. Also, "1" signal is fed to each of the selection terminals Se4 and Se5 of the selector 37, so that the data EFMD.AD and the data RC1F.AD are outputted from the output terminals Q1 and Q2 of the selector 37, respectively. Also, since the control signal C12D is rendered "1", the signal CaO is fed to the carry terminal Ci of the adder 38 via the AND gate 39, and "1" signal is fed to the carry terminal Ci of the adder 40.

As a result, the address data ADS at the timings when the control signal C2SYMB is rendered "1" is represented by the following formula (4):

$$ADS = MADR + EFMD.AD\ (x2) + RC1F.AD \\ (x2) + CaO + 1 \qquad (4)$$

wherein x2 represents the output of the C1/C2 symbol counter 32.

Then, at the time slot 4-3, the C1/C2 symbol counter 32 is reset by the control signal C12SYNC in the "1" state. Thereafter, at the time slots 4-4, 4-5, 4-6, 4-8, 4-9 ------ 4-42 when the control signal C2SYMB is rendered "1", the output data of the counter 32 represents "0", "1" ------ "27" so that the symbols in the areas indicated by the broken line lb in FIG. 17 are read therefrom. It will be appreciated from item (2) and FIG. 14 that the areas indicated by the broken line lb are addressed by the address data ADS.

The operation of the data error detection and correction circuit 8 and error flag detection circuit 10 at the C2 decoding will now be described briefly. First, the data error detection and correction circuit 8 calculates syndromes, detects a single error, detects a double error, corrects the double error and corrects the single error at respective periods TM2-1 to TM2-5. The circuit 8 outputs the error flags E0 to E2 and NE2 to the error flag detection circuit 10 at the time of detecting the single error and the double error. Also, the circuit 8 outputs data k representative of the position of an incorrect symbol (one symbol of the double error) at the time slots 6-33 and 6-36, data l representative of the position of an incorrect symbol (the other symbol of the double error) at the time slots 6-41 and 6-44 and data j representative of the position of an incorrect symbol (single error symbol) at the time slots 6-45 and 6-46 to the address control circuit 1 (see the control signal C1C in FIG. 16). The error flag detection circuit 10 produces the C2 flag in accordance with the C1 flag stored in the RAM 6 and the error flags E0 to E2 and NE2 outputted from the data error detection and correction circuit 8 and outputs it to the data bus DABS1 at the timings when the control signal WC2F is rendered "1" (FIG. 16).

(6) Control of Reading of the C1 Flag

As described above, at the C2 decoding, the error flag detection circuit 10 needs the C1 flag. Therefore, the reading of the C1 flags is effected following the reading of the symbols for the C2 decoding. The C1 flags necessary for the C2 decoding are the ones in the areas designated by reference characters F0, F4, F8 ------ F108 (FIG. 17), that is, every fifth area. These C1 flags are sequentially read at the timings when the control signal RC1F is rendered "1" (FIG. 16), and are fed to the error flag detection circuit 10.

At the timings when the control signal RC1F is rendered "1", "1" signal is fed to each of the selection terminal Se2 of the selector 35 and the selection terminal Se4 of the selector 37. Also, the control signal C12D fed to the AND gate 39 and the control signals C12D and DACD fed to the OR gate 40a are all in the "0" state. As a result, the address data ADS is represented by the following formula (5):

$$ADS = MADR + RC1F.AD\ (x2) \qquad (5)$$

Then, the C1/C2 symbol counter 32 is reset by the control signal C12SYNC in the "1" state at the time slot 5-3. Thereafter, the output data of the counter 32 represents "0", "1" ------ "27" at the time slots 5-4, 5-5, 5-6, 5-8, 5-9 ----- 5-42 when the control signal RC1F is rendered "1". As a result, the C1 flags are sequentially read from the RAM 6 (FIG. 14).

(7) Control of writing of the C2 flag

The error flag detection circuit 10 produces the C2 flags corresponding to symbols W0 to W23 to be fed to DAC and forms these C2 flags (each comprising 1 bit) into six data (hereinafter referred to as "first to sixth flag data"), these flag data being outputted to the data bus DABS1. In this case, the first flag data is composed of the C2 flags corresponding to symbols W0, W1, W6 and W7. The second flag data is composed of the C2 flags corresponding to symbols W12, W13, W18 and W19. The third flag data is composed of the C2 flags corresponding to symbols W2, W3, W8 and W9. The fourth flag data is composed of the C2 flags corresponding to symbols W14, W15, W20 and W21. The fifth flag data is composed of the C2 flags corresponding to symbols W4, W5, W10 and W11. The sixth flag data is composed of the C2 flags corresponding to symbols W16, W17, W22 and W23. The first to sixth flag data are sequentially fed to the data bus DABS1 at the time slots 6-16, 6-17, 6-18, 6-20, 6-21 and 6-22 when the control signal WC2F is rendered "1", and are written into the areas FO1, FO2, FO3, FO4, FO5 and FO6 (FIG. 17), respectively.

The number of areas for writing the C2 flags is 18 and the areas are designated by reference characters FO1 to FO36 (FIG. 17). As shown in FIG. 18, these areas constitute 6 relative regions SEF0 to SEF5, and the first to sixth flag data are written into the relative regions SEF0 to SEF5, respectively. Each of the relative regions SEF0, SEF2 and SEF4 is composed of two areas, and one area is used for writing the data while the other is used for reading the data to output to DAC. Each of the relative regions SEF1, SEF3 and SEF5 is composed of 4 areas. The reason for this is that the C2 flags need to be subjected to the delay operation of two units of delay time shown in FIG. 2. More specifically, the C2 flags of the first, third and fifth flag data written respectively into the relative regions SEF0, SEF2 and SEF4 correspond to the symbols not subjected to the delay operation of two units of delay time. On the other hand, the C2 flags of the second, fourth and sixth flag data written respectively into the relative regions SEF1, SEF3 and SEF5 correspond to the symbols subjected to the delay operation of two units of delay time.

Referring again to the control of writing of the C2 flags, the first to sixth flag data are outputted to the data bus DABS1 at the timings when the control signal WC2F is rendered "1", as described above. Therefore, the writing of these flag data is effected at the timings when the control signal WC2F is rendered "1".

When the control signal WC2F is rendered "1", "1" signal is fed to each of the selection terminal Se2 of the selector 35 and the selection terminal Se3 of the selector 37. At this time, the control signals C12D and DACD are still in the "0" state. As a result, the address data ADS is represented by the following formula (6):

$$ADS = MADR + WC2F.AD \ (x2) \tag{6}$$

Then, the C1/C2 symbol counter 32 is reset by the control signal C12SYNC at the time slot 6-3. Thereafter, the output data of the counter 32 represents "0", "1" ------ "5" at the time slots 6-16, 6-17, 6-18, 6-20, 6-21 and 6-22 when the control signal WC2F is rendered "1". As a result, at these time slots, the first to sixth flag data are sequentially written into the above-mentioned areas for the C2 flags (see FIG. 14).

(8) Control of reading/writing at the time of correcting of the C2 error

This reading/writing control is effected at the timings when the control signal C2C is rendered "1". At the timings when the control signal C2C is rendered "1", "1" signal is fed to each of the selection terminal Se3 of the selector 35 and the selection terminals Se4 and Se5 of the selector 37. At these timings, the control signal C12D is in the "1" state. As a result, the address data ADS is represented by the following formula:

$$ADS = MADR + EFMD.AD \ (k,l,j) + RC1F.AD \ (k,l,j) + CaO + 1 \tag{7}$$

The reading of an incorrect symbol and the writing of the corrected symbol are effected in accordance with the address data ADS represented by the formula (7). The operation of this address control is substantially the same as that described in item (4), and a detailed description thereof is omitted.

(9) Control of reading of C2 flag and symbols to output to DAC

Symbols W0 to W23 which have been subjected to the C1 and C2 decodings are read from the RAM 6 together with the C2 flags and fed to DAC. In this case, the reading of the C2 flags is effected at the timings when the control signal RC2F (FIGS. 15 and 16) is rendered "1". Also, the reading of the symbols is effected at the timings when the control signal DACD is rendered "1". The reading of the C2 flags and the reading of the symbols to be outputted to DAC are both effected in accordance with the output data DO of the DAC symbol counter 31. More specifically, the DAC symbol counter 31 is reset by the internal frame synchronization signal XFSYNC outputted at the end of the preceding frame processing period, and thereafter at the time slots 1-0, 1-1, 1-2, 1-25, 1-26, 2-0, 2-1, 2-2, 2-25, 2-26, ------- 6-0, 6-1, 6-2, 6-25, 6-26, the output data DO of the DAC symbol counter 31 represents "0", "1", "2", "25", ----- "29". At these time slots, one of the control signals RC2F and DACD is rendered "1" and the address control is effected in accordance with these output data DO.

The reading of the C2 flags will now be described. The reading of the C2 flags is effected by sequentially reading the first to sixth flag data in the areas F11, F32, F13, F34, F15 and F36 (FIGS. 17 and 18) at the time slots 1-0, 2-0, -- ---- 6-0. More specifically, at the timings when the control signal RC2F is rendered "1", "1" signal is fed to each of the selection terminal Se1 of the selector 35 and the selection terminal Se1 of the selector 37, and also the control signals C12D and DACD are in the "0" state. As a result, the address data ADS is represented by the following formula:

$$ADS = MADR + RC2F.AD \ (x3) \tag{8}$$

wherein x3 is the output of the ROM 34.

Thus, at the time slots 1-0, 2-0, ------ 6-0 when the output data DO of the DAC symbol counter 31 represents "0", "5", "10", "15", "20" and "25", the ROM 34 sequentially outputs data representative of "0", "1", "2", "3", "4" and "5" in accordance with these output data DO (FIG. 13). And, the address data ADS represented by the formula (8) is determined by the output data of the ROM 34 (FIG. 14), and the reading of the flag data (C2 flags) is effected.

The reading of the symbols to be fed to DAC will now be described. This is effected by reading the symbols in the areas indicated by a dot and dash line lc in FIG. 17. Each area storing the symbol not requiring the delay operation in the delay portion Dly6 (FIG. 2) is disposed one area below the area storing the symbol to be read for the C2 decoding (FIG. 17). Also, each area storing the symbol requiring the delay operation is disposed three areas below the area storing the symbol to be read for the C2 decoding.

At the timings when the control signal DACD is rendered "1", "1" signal is fed to each of the selection terminal Se1 of the selector 35 and the selection terminals Se2 and Se5 of the selector 37. And, since the control signal C12D is in the "0" state, the output signal of the AND gate 39 is in the "0" state, and the output signal of the OR gate 40a is in the "1" state. As a result, the address data ADS is represented by the following formula (9):

$$ADS = MADR + EFMD.AD\ (x3) + DACD.AD\ (x3) + 1 \qquad (9)$$

Then, at the time slots 1-1, 1-2, 1-25, 1-26, 2-1, 2-2, 2-25, 2-26, ------ 6-1, 6-2, 6-25 and 6-26 when the control signal DACD is rendered "1", the output data DO of the DAC symbol counter 31 represents "1", "2", "3", "4", "6", "7", "8", "9", "11", ------ "29". In accordance with these output data DO, the ROM 34 sequentially outputs data representative of "0", "1", "6", "7", "16", "17", "22", "23", -------- "27" (FIG. 13). The reason the output data of the ROM 34 is not increased regularly on the order of "0", "1", "2" ----is that the changing operation in the cross portion Cr 2 (FIG. 2) is to be effected. More specifically, as shown in FIG. 17, symbols W0 to W23 are stored in the RAM 6 in this order. However, this order is not the correct order which is shown at the left end of FIG. 1, therefore, it is necessary to read the symbols in the correct order to feed them to DAC.

Thus, the address data EFMD.AD and DACD.AD are read from the ROM 36 in the order designated by the output data of the ROM 34. The address data ADS are produced in accordance with the address data thus read, and in accordance with the address data ADS the symbols in the areas indicated by the dot and dash line lc in FIG. 17 are sequentially read. It is appreciated that the value of each address data DACD.AD is determined in view of the delay operation in the delay portion Dly6 in FIG. 2.

The reason the first to sixth flag data are of the above-mentioned construction is that the C2 flags corresponding to the respective symbols to be fed to DAC must be stored in the RAM 6 in the same order as the order in which the symbols to be fed to DAC are read from the RAM 6.

The foregoing is a detailed description of the address control circuit 1 of FIG. 12.

Figure 19:
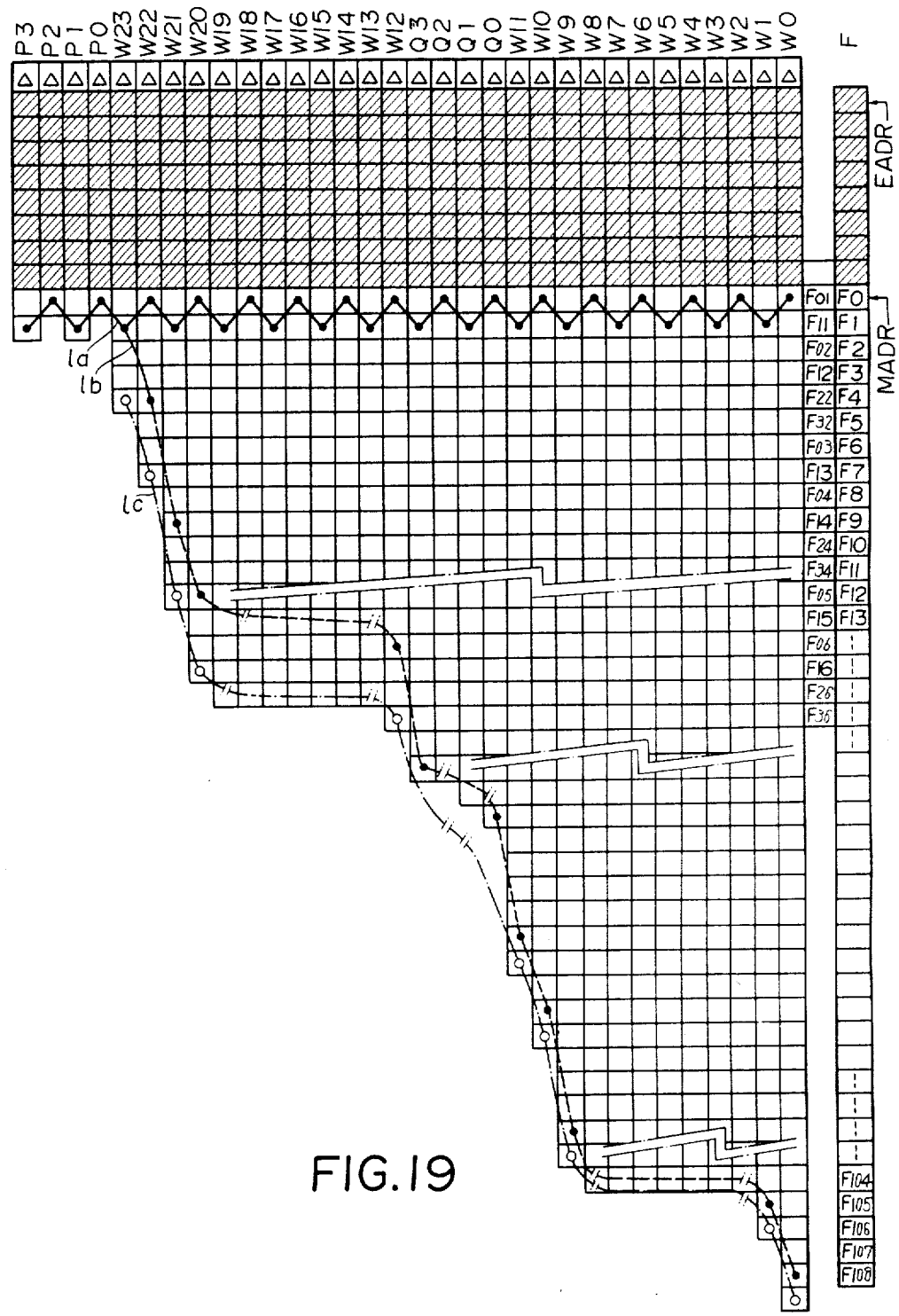
FIG. 19 is an illustration of RAM 6 in the condition of +4 jitter.
Figure 20:
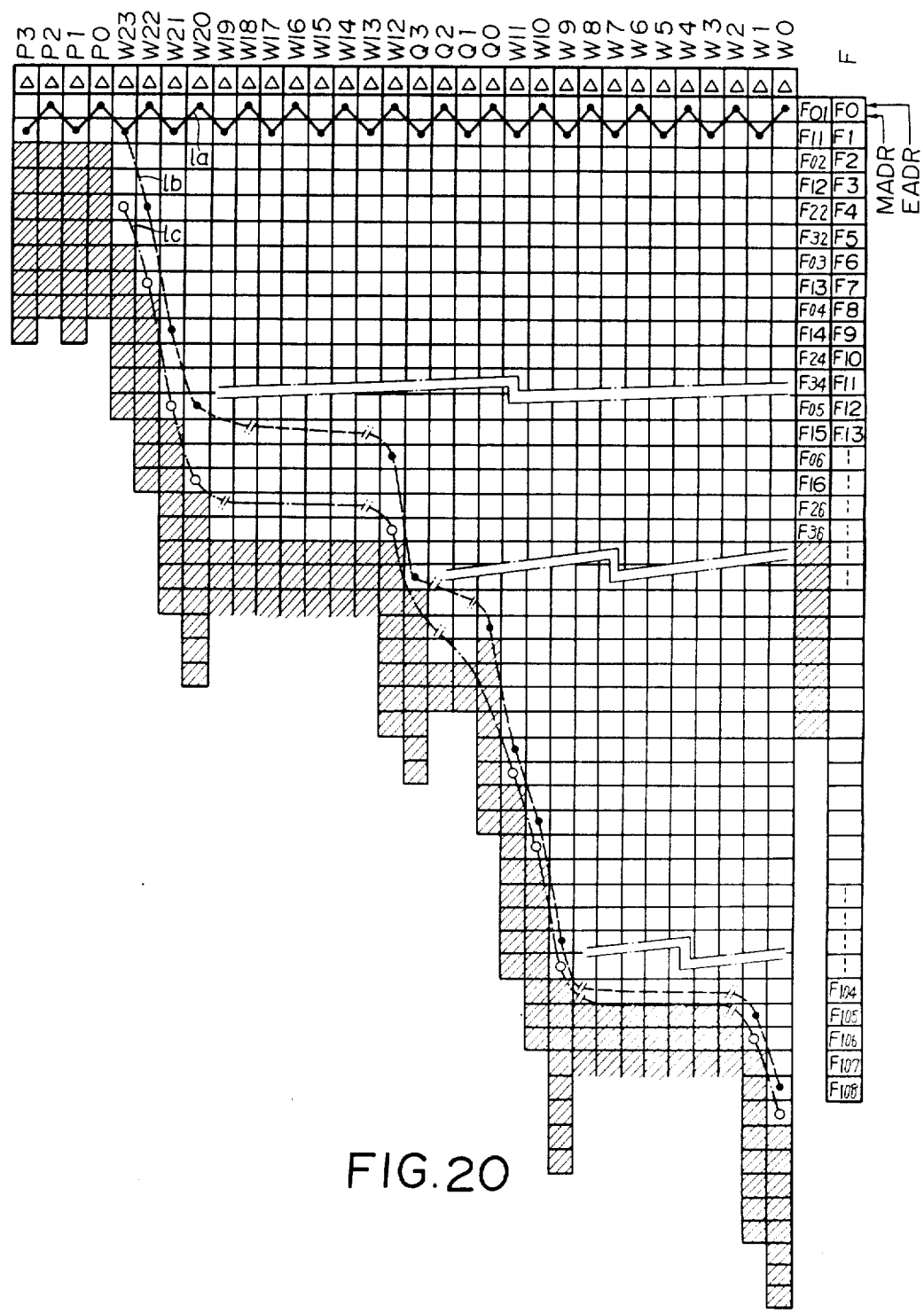
FIG. 20 is an illustration of RAM 6 in the condition of −4 jitter.

Incidentally, there is shown in FIG. 19 the contents of the RAM 6, when the phase of the EFM frame synchronization signal VFSYNC goes ahead four frames of that of the internal frame synchronization signal XFSYNC, that is, when there is a +four-frame jitter. On the other hand, there is shown in FIG. 20 the contents of the RAM 6 when the phase of the EFM frame synchronization signal VFSYNC is four frames behind that of the internal frame synchronization signal XFSYNC. In FIG. 20, the reference address EADR and the reference address MADR coincide with each other. However, "1" signal is not fed to the carry terminal of the adder 40 when writing the symbols, while "1" signal is fed to this carry terminal when reading the symbols to effect the C1 and C2 decodings and to output them to DAC. Therefore, the C1 decoding is not effected using the symbols in the areas into which symbols are being written.

What is claimed is:

1. A data processing circuit for a digital audio system in which symbol data read from a recording means are once stored in a symbol memory at specified data addresses so that data errors included in the stored symbol data are detected and corrected, the symbol data contained in the symbol memory after the detection and correction being read from the symbol memory for conversion into analog signals, said data processing circuit comprising:

means for generating a reference address data indicative of a data address of symbols stored in said symbol memory;

means for generating a relative address data indicative of a data address of symbols stored in said symbol memory relative to the reference address data;

first adder means for adding said relative address data to said reference address data to form an absolute address data indicative of a data address of said symbol memory, said absolute address data being supplied to said symbol memory to address the absolute address of said symbol memory so that a symbol data in said absolute address is processed;

means for generating an internal clock pulse;

first signal generating means responsive to said internal clock pulses for generating an internal frame synchronization signal representative of the transition from one data processing period of a frame of said stored symbol data to the data processing period following said one data processing period; and second signal generating means for discriminating a frame synchronization pattern from said symbol data read from the recording means to output an EFM frame synchronization signal;

said reference address data generating means comprising (a) first counter means for counting said internal frame synchronization signals, (b) second counter means for counting said internal frame synchronization signals in one of upward and downward directions and for counting said EFM frame synchronization signals in the other of upward and downward directions, and (c) second adder means for adding both outputs of said first and second counter means together when said symbol data read from said recording means are being stored in said symbol memory, said second adder means outputting the output of said first counter means when said symbol data read from said recording means are not being stored in said symbol memory, an output of said second adder means being supplied to said first adder means as said reference address data.

2. A data processing circuit for a digital audio system in which symbol data read from a recording means are stored in a symbol memory in a first mode of operation of said data processing circuit so that data errors included in said stored symbol data are detected and corrected in a second mode of operation of said circuit, the symbol data contained in said symbol memory after said detection and correction being read from said symbol memory in a third mode of operation of said circuit for conversion into analog signals, said data processing circuit comprising:

(a) means for generating a reference address data indicative of a data address of symbols stored in said symbol memory;

(b) memory means having a plurality of storage areas for storing addressing data to be used in combination with said reference address data;

(c) first, second, and third counter means operable in said first, second, and third modes of operation, respectively, for generating address data used in each respective mode of operation;

(d) first selection means for selectively supplying the output of one said first, second or third counter means to said memory means to simultaneously address one of the addresses of each of said storage areas;

(e) second selection means for selectively outputting a specific pair of addressing data read from said memory means;

(f) first adder means for adding said specific pair of addressing data together to form a relative address data indicative of a data address of symbols stored in the memory relative to the reference address data; and (g) second adder means for adding said relative address data to said reference address data to form an absolute address data indicative of an absolute address of said symbol memory, said absolute address data being supplied to said symbol memory to address the absolute address of said symbol memory so that a symbol data in said absolute address is processed, wherein said reference address data generating means comprises:

means for generating an internal clock pulse;

first signal generating means responsive to said internal clock pulses for generating an internal frame synchronization signal representative of the transition from one data processing period of a frame of said stored symbol data to the data processing period following said one data processing period; and second signal generating means for discriminating a frame synchronization pattern from said symbol data read from the recording means to output an EFM frame synchronization signal;

said reference address data generating means comprising (a) fourth counter means for counting said internal frame synchronization signals, (b) fifth counter means for counting said internal frame synchronization signals in one of upward and downward directions and for counting said EFM frame synchronization signals in the other of upward and downward directions, and (c) third adder means for adding both outputs of said fourth and fifth counter means together when said symbol data read from said recording means are being stored in said symbol memory, said third adder means outputting the output of said fourth counter means when said symbol data read from said recording means are not being stored in said symbol memory, an output of said third adder means being supplied to said second adder means as said reference address data.

3. A data processing circuit for a digital audio system in which symbol data read from a recording means are once stored in a symbol memory so that data error included in said stored symbol data are detected and corrected, the symbol data contained in said symbol memory after said detection and correction being read from said symbol memory for conversion into analog signals, said data processing circuit comprising:

buffer register means for temporarily storing each of said symbol data read from said recording means;

signal generating means communicating with said buffer register means for outputting a first signal when each of said symbol data read from said recording means is stored in said buffer register means;

timing pulse generating means for generating a spcific number of timing pulses during each period required for processing one frame of said symbol data, said specific number being greater than the number of symbol data in one frame of said symbol data; and circuit means for writing the symbol data stored in said buffer register means into said symbol memory when both of said first signal and said timing pulse are outputted, wherein said buffer register means comprises a plurality of registers serially connected to one another to form stages, each of said symbol data read from the recording means being stored into the first stage register of said registers, a symbol data stored in one of stages of said registers being tansferred to the stage next to said one of stages when said next stage is empty, said signal generating means generating said first signal when one of said symbol data is stored in the last stage of said register, said circuit means writing a symbol data stored in the last stage of said registers into said symbol memory when both of said first signal and said timing pulse are outputted.

4. A data processing circuit for a digital audio system in which symbols recorded on a recording medium in delayed relation to one another over a plurality of frames are sequentially read from the recording medium and stored in a symbol memory, said data processing circuit comprising:

first timing signal generating means for generating frame synchronization signals synchronized with the frames of said sequentially read symbols;

reference address data generating means rsponsive to said frame synchronization signals to generate reference address data indicative of a data address of symbols stored in said symbol memory;

relative address data generating means for generating relative address data indicative of a data address of symbols stored in said symbol memory relative to the reference address data; and first adder means for adding said reference address data to said relative address data to produce absolute address data indicative of an absolute address of symbols stored in said symbol memory, said absolute address data being fed to said symbol memory to access said absolute address for processing a symbol contained therein; and wherein said relative address data generating means comprises:

second memory means for storing at least three groups of addressing data, a first one of the addressing-data groups defining the delayed relations of those symbols to be successively written from the recording medium into said symbol memory, a second one of the addressing-data groups defining the delayed relations of those stored symbols to be processed to detect and correct errors contained in said stored symbols, a third one of the addressing-data groups defining the delayed relations of those stored symbols which are to be sequentially read out of said symbol memory for conversion into analog signals;

second timing signal generating means for generating, in a time sharing manner, a first timing signal for causing each symbol read from said recording medium to be stored into said symbol memory, a second timing signal for causing each of these stored symbols to be processed to detect errors thereof and correct the errors, and a third timing signal for causing each of those stored symbols, which have been subjected to the error detection and correction, to be read from said symbol memory for conversion into an analog signal;

first counter means for counting the first timing signals to produce first address information to be supplied to said second memory means for sequentially reading said first group of addressing data;

second counter means for counting the second timing signals to produce second address information to be supplied to said second memory means for sequentially reading said second group of addressing data; and third counter means for counting the third timing signals to produce third address information to be supplied to said second memory means for sequentially reading said third group of addressing data;

each addressing data of the first to third groups of addressing data thus read from said second memory means being suplied to said first adder means as said relative address data.

5. A data procesing circuit according to claim 4, wherein said relative address data generating means further comprises first selector means responsive to said first to third timing signals for selectively supplying one of said first address information, said second address information, and said third address information to said second memory means for accessing.

6. A data processing circuit according to claim 5, wherein said second memory means comprises a plurality of storage areas each for storing a group of data, an address of one of said plurality of storage areas and the corresponding addresses of the other storage areas being simultaneously accessed by each address information supplied from said first selector means to thereby read the data from each of the plurality of storage areas, and wherein said relative address data generating means further comprises:

second selector means for selectively outputting a first specific pair among said data simultaneously read from said second memory means in response to said first timing signal, for selectively outputting a second specific pair among said data simultaneously read from said second memory means in response to said second timing signal, and for selectively outputting a third specific pair among said data simultaneously read from said second memory means in response to said third timing signal; and second adder means for adding each pair of data outputted from said second selector means together to output an addition result to said first adder means as said relative address data, the addition result of the first data pair corresponding to said first group of addressing data, the addition result of the second data pair corresponding to said second group of addressing data, the addition result of the third data pair corresponding to said third group of addressing data.

7. A data processing circuit according to claim 4, wherein said first timing signal generating means comprises third timing signal generating means for generating an internal frame synchronization signal representative of each transition from one data processing period of a frame of said stored symbols to the data processing period following said one data processing period and fourth timing signal generating means for discriminating each frame synchronization pattern from said symbols read from said recording medium to output an EFM frame synchronization signal, said internal frame synchronization signal and said EFM synchronization signal forming said frame synchronization signals; and wherein said reference address data generating means comprises:

fourth counter means for counting the internal frame synchronization signals;

fifth counter means for counting the internal frame synchronization signals in one of upward and downward directions and for counting the EFM synchronization signals in the other direction; and third adder means for adding both outputs of said fourth and fifth counter means together to produce an addition result, for outputting said addition result therefrom to said first adder means as said reference address data when each symbol read from said recording medium stored in said symbol memory, and for outputting the output of said fourth counter means to said first adder means as said reference address data when each symbol read from said recording medium is not stored in said symbol memory.

8. A data processing circuit according to claim 4 further comprising buffer register means for temporarily storing each of the symbols read from said recording medium, and wherein said second timing signal generating means comprises:

fifth timing signal generating means for generating a fifth timing signal when each of the symbols read from said recording medium has been stored in said buffer register means;

timing pulse generating means for generating a specific number of timing pulses during each period required for processing each frame of symbols stored in said symbol memory, said specific number being greater than the number of the symbols contained in each frame; and circuit means for causing said first timing signal to be outputted to store said symbol contained in said buffer register means into that address of said symbol memory indicated by the output of said first adder means when both of the fifth timing signal and the timing pulse are simultaneously generated.

9. A data processing circuit according to claim 8, wherein said buffer register means comprises a plurality of registers serially connected to one another to form stages, each of said symbols read from said recording medium being stored into the first stage register, a symbol stored in one of the stages being transferred to the stage next to said one stage when said next stage is empty, said fifth timing signal generating means generating said fifth timing signal when one of said symbols read from said recording medium has been stored in the last stage register, said one symbol stored in said last stage register being stored into said symbol memory when said first timing signal is outputted form said second timing signal generating means.

* * * * *